United States Patent
Russ et al.

(10) Patent No.: US 11,288,913 B2
(45) Date of Patent: Mar. 29, 2022

(54) AUGMENTED REALITY SYSTEMS METHODS FOR DISPLAYING REMOTE AND VIRTUAL PLAYERS AND SPECTATORS

(71) Applicant: IGT, Las Vegas, NV (US)

(72) Inventors: Michael Russ, Graz (AT); Elisabeth Kiss, Unterpremstätten (AT); Caprice Mitterhoefer, Graz (AT); Julia-Ines Lerchbaumer, Spielfeld (AT); Petra Wagner, Leibnitz (AT)

(73) Assignee: IGT, Las Vegas, NV (US)

( * ) Notice: Subject to any disclaimer, the term of this patent is extended or adjusted under 35 U.S.C. 154(b) by 28 days.

(21) Appl. No.: 15/852,201

(22) Filed: Dec. 22, 2017

(65) Prior Publication Data

US 2019/0051101 A1    Feb. 14, 2019

Related U.S. Application Data

(63) Continuation-in-part of application No. 15/672,560, filed on Aug. 9, 2017.

(51) Int. Cl.
| | |
|---|---|
| *G07F 17/32* | (2006.01) |
| *G06Q 50/34* | (2012.01) |
| *G06T 13/40* | (2011.01) |
| *G06T 19/00* | (2011.01) |
| *H04L 29/06* | (2006.01) |
| *H04L 67/131* | (2022.01) |

(52) U.S. Cl.
CPC ......... *G07F 17/3211* (2013.01); *G06Q 50/34* (2013.01); *G06T 13/40* (2013.01); *G06T 19/006* (2013.01); *G07F 17/3223* (2013.01); *H04L 67/38* (2013.01)

(58) Field of Classification Search
CPC .. G07F 17/3211; G07F 17/3223; G06T 13/40; G06T 19/006; H04L 67/38
See application file for complete search history.

(56) References Cited

U.S. PATENT DOCUMENTS

| | | |
|---|---|---|
| 8,235,529 B1 | 8/2012 | Raffle et al. |
| 8,558,759 B1 | 10/2013 | Prada Gomez et al. |
| 8,821,274 B2 | 9/2014 | Lyons et al. |
| 8,943,420 B2 | 1/2015 | Goldthwaite et al. |
| 9,280,867 B2 | 3/2016 | Froy et al. |
| 9,280,868 B2 | 3/2016 | Froy et al. |
| 9,285,592 B2 | 3/2016 | Olsson et al. |
| 9,412,201 B2 | 8/2016 | Kinnebrew et al. |
| 9,558,612 B2 | 1/2017 | Lyons et al. |
| 9,558,620 B2 | 1/2017 | Froy et al. |
| 9,569,920 B2 | 2/2017 | Froy et al. |

(Continued)

*Primary Examiner* — Werner G Garner
(74) *Attorney, Agent, or Firm* — Sage Patent Group

(57) ABSTRACT

An augmented reality method for displaying remote and virtual players and spectators includes generating a live video signal of a first scene associated with a field of view of a first user, wherein the first scene comprises at least one gaming element associated with a game being played by the first user at a first location. The method further includes determining a second user associated with the first user, wherein the second user is at a second location. The method further includes displaying an avatar of the second user to the first user so that the avatar is part of the first scene.

18 Claims, 32 Drawing Sheets

(56) References Cited

U.S. PATENT DOCUMENTS

| | | | |
|---|---|---|---|
| 2010/0306825 A1* | 12/2010 | Spivack | G06F 16/9535 |
| | | | 726/4 |
| 2012/0122570 A1* | 5/2012 | Baronoff | A63F 13/79 |
| | | | 463/31 |
| 2013/0184064 A1* | 7/2013 | Manning | G07F 17/3211 |
| | | | 463/25 |
| 2013/0210523 A1* | 8/2013 | Arumugam | G07F 17/3255 |
| | | | 463/31 |
| 2014/0121015 A1 | 5/2014 | Massing et al. | |
| 2014/0168261 A1 | 6/2014 | Margolis et al. | |
| 2015/0213650 A1* | 7/2015 | Barzuza | H04L 12/1827 |
| | | | 348/14.07 |
| 2015/0228153 A1* | 8/2015 | Hedrick | G06Q 20/3223 |
| | | | 463/25 |
| 2016/0373570 A1 | 12/2016 | Scavezze et al. | |
| 2017/0011554 A1* | 1/2017 | Burba | A63F 13/5255 |

* cited by examiner

2300

GENERATE A LIVE VIDEO SIGNAL OF A SCENE ASSOCIATED WITH A FIELD OF VIEW OF A USER, WHEREIN THE SCENE COMPRISES AT LEAST ONE FIRST GAMING ELEMENT ASSOCIATED WITH A WAGERING GAME, WHEREIN THE AT LEAST ONE FIRST GAMING ELEMENT CORRESPOND TO A FIRST OUTCOME OF THE WAGERING GAME
2302

DETERMINE, BASED ON THE LIVE VIDEO SIGNAL, AT LEAST ONE SECOND GAMING ELEMENT IN REAL TIME
2304

DISPLAY THE AT LEAST ONE SECOND GAMING ELEMENT TO THE USER IN ASSOCIATION WITH THE AT LEAST ONE FIRST GAMING ELEMENT AS PART OF THE SCENE SO THAT THE SECOND GAMING ELEMENT IS DISPLAYED AS PART OF THE WAGERING GAME, WHEREIN THE AT LEAST ONE FIRST GAMING ELEMENT AND THE AT LEAST ONE SECOND GAMING ELEMENT CORRESPOND TO A SECOND OUTCOME OF THE WAGERING GAME
2306

FIG. 23

AUGMENTED REALITY SYSTEMS METHODS FOR DISPLAYING REMOTE AND VIRTUAL PLAYERS AND SPECTATORS

RELATED APPLICATIONS

This application is a continuation-in-part application of U.S. application Ser. No. 15/672,560 ("AUGMENTED REALITY SYSTEMS AND METHODS FOR GAMING"), filed on Aug. 9, 2017, the contents of which are incorporated by reference herein in its entirety.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

Embodiments described herein relate to augmented reality systems and methods, and in particular to augmented reality systems and methods for displaying remote and virtual players and spectators.

BACKGROUND

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. For example, early slot machines allowed player interaction by pulling a lever or arm on the machine. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three dimensional display screens.

SUMMARY

According to an embodiment, a method comprises generating a live video signal of a first scene associated with a field of view of a first user, wherein the first scene comprises at least one gaming element associated with a game being played by the first user at a first location. The method further comprises determining a second user associated with the first user, wherein the second user is at a second location. The method further comprises displaying an avatar of the second user to the first user so that the avatar is part of the first scene.

According to another embodiment, According to an embodiment, the first location and the second location are in a common gaming location.

According to another embodiment, the common gaming location is a casino.

According to another embodiment, the second location is a remote location relative to the first location.

According to another embodiment, the method further comprises displaying a spectator avatar to the first user so that the spectator avatar is part of the first scene.

According to another embodiment, the spectator avatar is associated with a first spectator at a location different from the first location.

According to another embodiment, the spectator avatar is a virtual spectator.

According to another embodiment, the method further comprises displaying a second scene of the game to the second user associated with a field of view of the second user so that the second scene comprises the avatar of the first user and the at least one gaming element.

According to another embodiment, a method comprises generating a live video signal of a first scene associated with a field of view of a first user, wherein the first scene comprises at least one gaming element associated with a game being played by the first user at a first location. The method further comprises displaying a spectator avatar to the first user so that the spectator avatar is part of the first scene.

According to another embodiment, the spectator avatar is associated with a first spectator at a location different from the first location.

According to another embodiment, the spectator avatar is a virtual spectator.

According to another embodiment, an augmented reality system comprises a memory and a processing device coupled to the memory. The processing device is configured to generate a live video signal of a first scene associated with a field of view of a first user, wherein the first scene comprises at least one gaming element associated with a game being played by the first user at a first location. The processing device is further configured to determine a second user associated with the first user, wherein the second user is at a second location. The processing device is further configured to display an avatar of the second user to the first user so that the avatar is part of the first scene.

According to another embodiment, the first location and the second location are in a common gaming location.

According to another embodiment, the common gaming location is a casino.

According to another embodiment, the second location is a remote location relative to the first location.

According to another embodiment, the processing device is further configured to display a spectator avatar to the first user so that the spectator avatar is part of the first scene.

According to another embodiment, the processing device is further configured to display a second scene of the game to the second user associated with a field of view of the second user so that the second scene comprises the avatar of the first user and the at least one gaming element.

According to another embodiment, an augmented reality system comprises a memory and a processing device coupled to the memory. The processing device is configured to generate a live video signal of a first scene associated with a field of view of a first user, wherein the first scene comprises at least one gaming element associated with a game being played by the first user at a first location. The processing device is further configured to display a spectator avatar to the first user so that the spectator avatar is part of the first scene.

According to another embodiment, the spectator avatar is associated with a first spectator at a location different from the first location.

According to another embodiment, the spectator avatar is a virtual spectator.

BRIEF DESCRIPTION OF THE DRAWINGS

FIGS. 20-26 are flowcharts illustrating operations of systems/methods according to some embodiments.

DETAILED DESCRIPTION

Embodiments of the inventive concepts provide systems and methods for displaying three-dimensional content on or in connection with an electronic gaming machine (EGM), or even independently from an EGM, to a player of an EGM or an observer (non-player) who is watching a player play an EGM. The three dimensional content may be associated with two-dimensional content that is displayed on the EGM. According to various embodiments, the 3D content can be rendered to the player on an augmented reality viewer, such as an augmented reality headset that communicates with the EGM so that the 3D content displayed to the player on the augmented reality headset is coordinated with the 2D content displayed on the EGM. "Augmented reality" may also be referred to as "mixed reality."

Some embodiments provide a headset display with pass through mixed reality rendering and which supports room scanning to generate a 3D model of an area around a user of the headset. The 3D model and 3D scanner can be used to track and locate objects, such as a user, a user's hand, other players, EGMs, etc., within an area, such as a casino floor. The headset display allows the user to see 3D virtual objects that appear to be physically present in the real world. The headset display also allows the user to move around while 3D rendered virtual objects (e.g. interface buttons, avatars, videos, personally pinned alerts/notifications/statistics etc.) may appear to stay in place or move along with the player.

In particular embodiments, a casino operator or patron may use a mixed reality headset display to obtain information about a player in the casino.

These and other embodiments are described in more detail below.

Augmented Reality EGM Systems and Viewers

Figure 1:
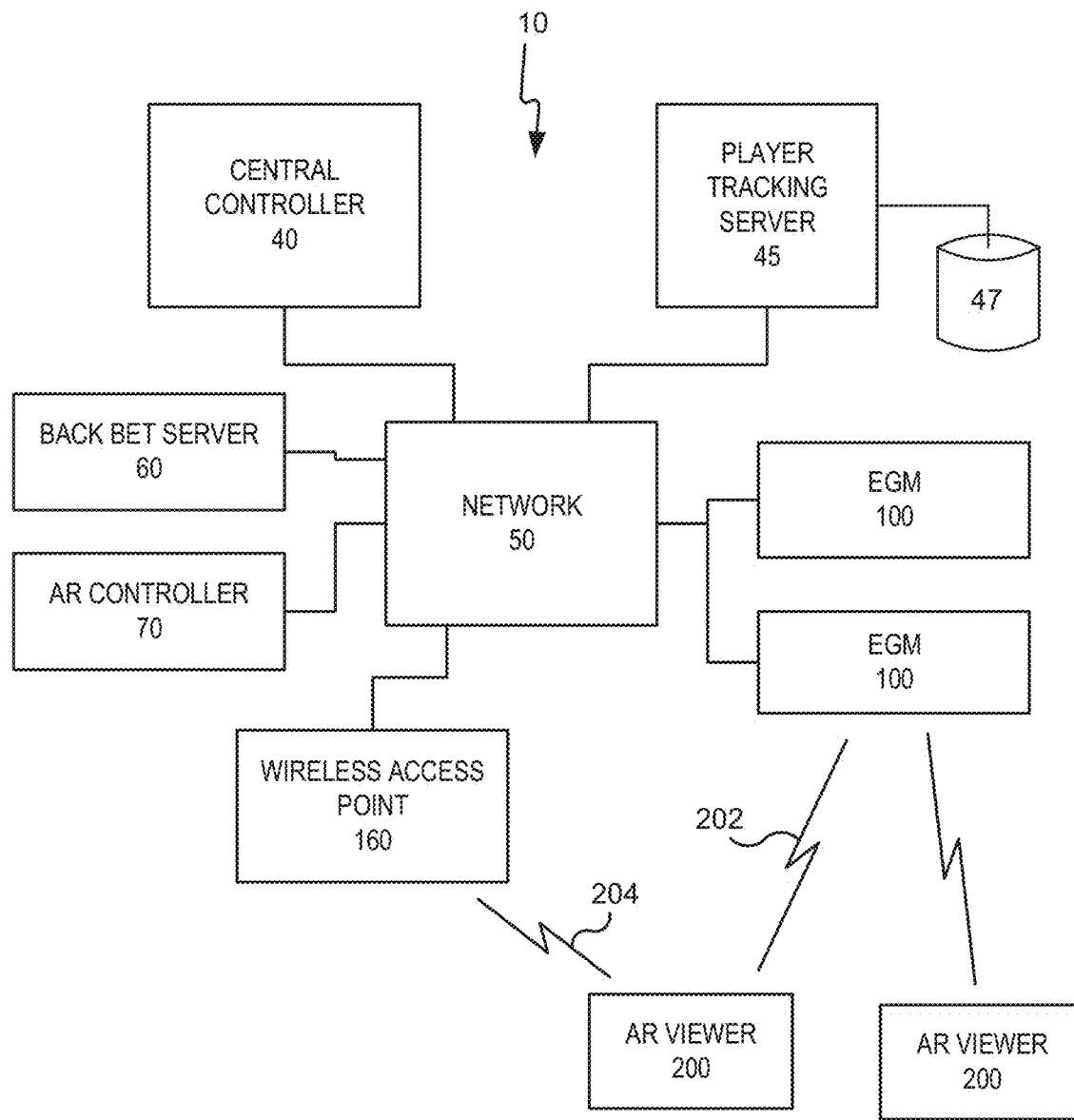
FIG. 1 is a schematic block diagram illustrating a network configuration for a plurality of gaming devices according to some embodiments.

Referring to FIG. 1, a gaming system 10 including a plurality of EGMs 100 is illustrated. The gaming system 10 may be located, for example, on the premises of a gaming establishment, such as a casino. The EGMs 100, which are typically situated on a casino floor, may be in communication with each other and/or at least one central controller 40 through a data network or remote communication link 50. The data communication network 50 may be a private data communication network that is operated, for example, by the gaming facility that operates the EGM 100. Communications over the data communication network 50 may be encrypted for security. The central controller 40 may be any suitable server or computing device which includes at least one processor and at least one memory or storage device. Each EGM 100 may include a processor that transmits and receives events, messages, commands or any other suitable data or signal between the EGM 100 and the central controller 40. The EGM processor is operable to execute such communicated events, messages or commands in conjunction with the operation of the EGM. Moreover, the processor of the central controller 40 is configured to transmit and receive events, messages, commands or any other suitable data or signal between the central controller 40 and each of the individual EGMs 100. In some embodiments, one or more of the functions of the central controller 40 may be performed by one or more EGM processors. Moreover, in some embodiments, one or more of the functions of one or more EGM processors as disclosed herein may be performed by the central controller 40.

A wireless access point 160 provides wireless access to the data communication network 50. The wireless access point 160 may be connected to the data communication network 50 as illustrated in FIG. 1, or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, a mixed reality viewer 200, or AR viewer 200, is provided. The AR viewer 200 communicates with one or more elements of the system 10 to render two dimensional (2D) and/or three dimensional (3D) content to a player of one of the EGMs 100 in a virtual space, while at the same time allowing the player to see objects in the real space around the player. That is, the AR viewer 200 combines a virtual image with real images perceived by the user, including images of real objects as well as images displayed by the EGM 100. In this manner, the AR viewer 200 "mixes" real and virtual reality into a single viewing experience for the player. In some embodiments, the AR viewer 200 may be further configured to enable the player to interact with both the real and virtual objects displayed to the player by the AR viewer 200.

The AR viewer 200 communicates with one or more elements of the system 10 to coordinate the rendering of mixed reality images, and in some embodiments mixed reality 3D images, to the player. For example, in some embodiments, the AR viewer 200 may communicate directly with an EGM 100 over a wireless interface 202, which may be a WiFi link, a Bluetooth link, an NFC link, etc. In other embodiments, the AR viewer 200 may communicate with the data communication network 50 (and devices connected thereto, including EGMs) over a wireless interface 204 with the wireless access point 160. The wireless interface 204 may include a WiFi link, a Bluetooth link, an NFC link, etc. In still further embodiments, the AR viewer 200 may communicate simultaneously with both the EGM 100 over the wireless interface 202 and the wireless access point 160 over the wireless interface 204. In these embodiments, the wireless interface 202 and the wireless interface 204 may use different communication protocols and/or different communication resources, such as different frequencies, time slots, spreading codes, etc. For example, in some embodiments, the wireless interface 202 may be a Bluetooth link, while the wireless interface 204 may be a WiFi link.

The wireless interfaces 202, 204 allow the AR viewer 200 to coordinate the generation and rendering of mixed reality images to the player via the AR viewer 200.

In some embodiments, the gaming system 10 includes a mixed reality controller, or AR controller 70. The AR controller 70 may be a computing system that communicates through the data communication network 50 with the EGMs 100 and the AR viewers 200 to coordinate the generation and rendering of virtual images to one or more players using the AR viewers 200. The AR controller 70 may be implemented within or separately from the central controller 40.

In some embodiments, the AR controller 70 may coordinate the generation and display of the virtual images of the same virtual object to more than one player by more than one AR viewer 200. As described in more detail below, this may enable multiple players to interact with the same virtual object together in real time. This feature can be used to provide a shared multiplayer experience to multiple players at the same time.

Moreover, in some embodiments, the AR controller 70 may coordinate the generation and display of the same virtual object to players at different physical locations, as will be described in more detail below.

The AR controller 70 may store a three dimensional wireframe map of a gaming area, such as a casino floor, and may provide the three dimensional wireframe map to the AR viewers 200. The wireframe map may store various information about EGMs in the gaming area, such as the identity, type and location of various types of EGMs. The three dimensional wireframe map may enable an AR viewer 200 to more quickly and accurately determine its position and/or orientation within the gaming area, and also may enable the AR viewer 200 to assist the player in navigating the gaming area while using the AR viewer 200. The generation of three dimensional wireframe maps is described in more detail below.

In some embodiments, at least some processing of virtual images and/or objects that are rendered by the AR viewers 200 may be performed by the AR controller 70, thereby offloading at least some processing requirements from the AR viewers 200.

A back bet server 60 may be provided to manage back bets placed using an AR viewer 200 as described in more detail below. An AR viewer 200 may communicate with the back bet server 60 through the wireless interface 204 and network 50.

Referring to FIGS. 2A to 2D, the AR viewer 200 may be implemented in a number of different ways. For example, referring to FIG. 2A, in some embodiments, an AR viewer 200A may be implemented as a 3D headset including a pair of semitransparent lenses 212 on which images of virtual objects may be displayed. Different stereoscopic images may be displayed on the lenses 212 to create an appearance of depth, while the semitransparent nature of the lenses 212 allow the user to see both the real world as well as the 3D image rendered on the lenses 212. The AR viewer 200A may be implemented, for example, using a Hololens™ from Microsoft Corporation. The Microsoft Hololens includes a plurality of cameras and other sensors 211 that the device uses to build a 3D model of the space around the user. The device 200A can generate a 3D image to display to the user that takes into account the real world objects around the user and allows the user to interact with the 3D object.

The device 200A may further include other sensors, such as a gyroscopic sensor, a GPS sensor, one or more accelerometers, and/or other sensors that allow the device 200A to determine its position and orientation in space. In further embodiments, the device 200A may include one or more cameras that allow the device 200A to determine its position and/or orientation in space using visual simultaneous localization and mapping (VSLAM). The device 200A may further include one or more microphones and/or speakers that allow the user to interact audially with the device.

Figure 2A:
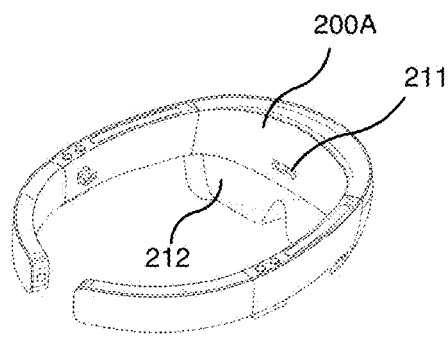
FIGS. 2A to 2D illustrate mixed reality viewers according to various embodiments.
Figure 2B:
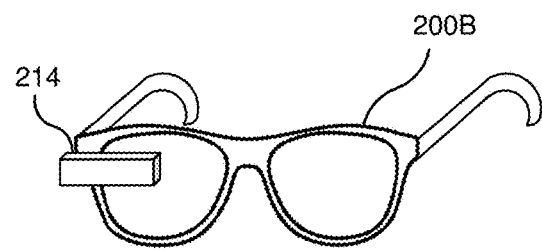

Referring to FIG. 2B, an AR viewer 200B may be implemented as a pair of glasses 200B including a transparent prismatic display 214 that displays an image to a single eye of the user. An example of such a device is the Google Glass device. Such a device may be capable of displaying images to the user while allowing the user to see the world around the user, and as such can be used as a mixed reality viewer. However, it will be appreciated that the device 200B may be incapable of displaying 3D images to the user.

Figure 2C:
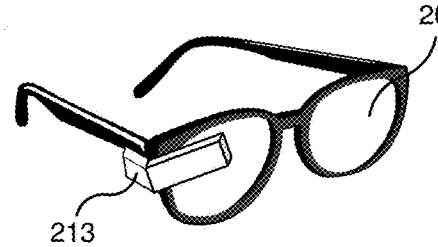
Figure 2D:
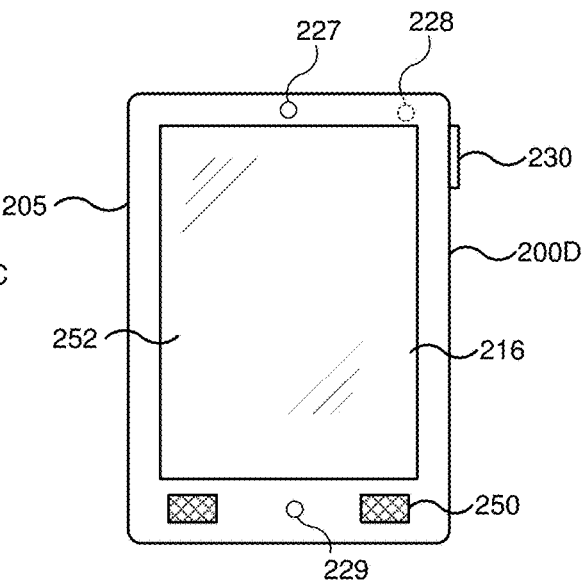

In other embodiments, referring to FIG. 2C, the AR viewer may be implemented using a virtual retinal display device 200C. In contrast to devices that display an image within the field of view of the user, a virtual retinal display raster scans an image directly onto the retina of the user. Like the device 200B, the virtual retinal display device 200C combines the displayed image with surrounding light to allow the user to see both the real world and the displayed image. However, also like the device 200B, the virtual retinal display device 200C may be incapable of displaying 3D images to the user.

In still further embodiments, an AR viewer 200D may be implemented using a mobile wireless device, such as a mobile telephone, a tablet computing device, a personal digital assistant, or the like. The device 200D may be a handheld device including a housing 205 on which a touchscreen display device 216 including a digitizer 252 is provided. An input button 230 may be provided on the housing and may act as a power or control button. A rear facing camera 227 may be provided in a front face of the housing 205. The device 200D may further include a front facing camera 228 on a rear face of the housing 205. The device 200D may include one or more speakers 250 and a microphone 229. The device 200D may provide a mixed reality display by capturing a video signal using the front facing camera 228 and displaying the video signal on the display device 216, and also displaying a rendered image of a virtual object over the captured video signal. In this manner, the user may see both a mixed image of both a real object in front of the device 200D as well as a virtual object superimposed over the real object to provide a mixed reality viewing experience.

3D Environment Generation

Figure 3A:
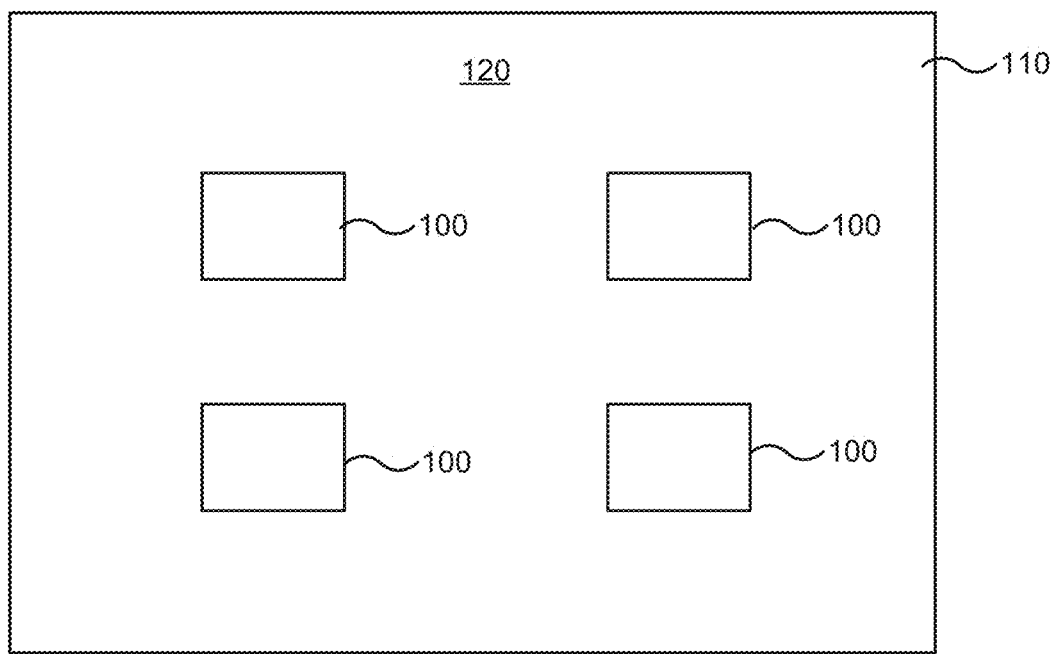
FIG. 3A is a map of a gaming area, such as a casino floor.

FIG. 3A illustrates, in plan view, an example map 110 of a gaming area 120. The gaming area 120 may, for example, be a casino floor. The map 110 shows the location of a plurality of EGMs 100 within the gaming area 120. As will be appreciated, the locations of the EGMs 100 within a gaming area 120 are generally fixed, although a casino operator may relocate EGMs from time to time, such as when new EGMs are introduced, to create new traffic flow patterns within the gaming area 120, to feature or highlight certain games, etc. As noted above, in order to assist the operation of the AR viewers 200, the AR controller 70 may store a three dimensional wireframe map of the gaming area 120, and may provide the three dimensional wireframe map to the AR viewers 200.

Figure 3B:
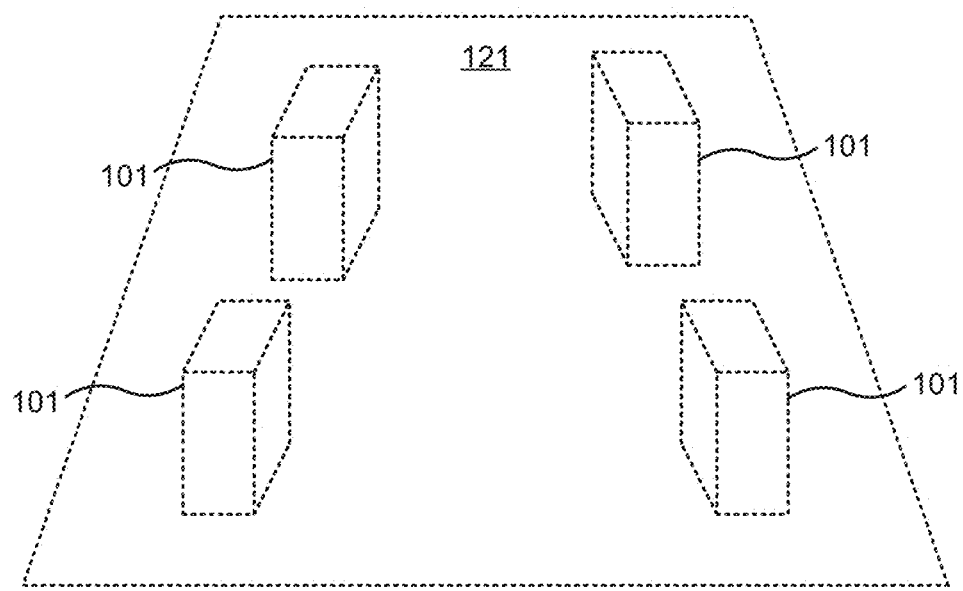
FIG. 3B is a 3D wireframe model of the gaming area of FIG. 3A.

An example of a wireframe map 121 is shown in FIG. 3B. The wireframe map is a three-dimensional model of the gaming area 120. As shown in FIG. 3B, the wireframe map 121 includes wireframe models 101 corresponding to the EGMs 100 that are physically in the gaming area 120. The wireframe models 101 may be pregenerated to correspond to various EGM form factors, such as single display EGMs, mechanical slot EGMs, dual display EGMs, etc. The pregenerated models may then be placed into the wireframe map, for example, by a designer or other personnel. The wireframe map 121 may be updated whenever the physical location of EGMs in the gaming area 120 is changed.

In some embodiments, the wireframe map 121 may be generated automatically using an AR viewer 200, such as a 3D headset, that is configured to perform a three-dimensional depth scan of its surroundings and generate a three dimensional model based on the scan results. Thus, for example, an operator using an AR viewer 200A (FIG. 2A) may perform a walkthrough of the gaming area 120 while the AR viewer 200A builds the 3D map of the gaming area.

The three dimensional wireframe map 121 may enable an AR viewer 200 to more quickly and accurately determine its position and/or orientation within the gaming area. For example, an AR viewer 200 may determine its location within the gaming area 120 using one or more position/orientation sensors. The AR viewer 200 then builds a three dimensional map of its surroundings using depth scanning, and compares its sensed location relative to objects within the generated three dimensional map with an expected location based on the location of corresponding objects within the wireframe map 121. The AR viewer 200 may calibrate or refine its position/orientation determination by comparing the sensed position of objects with the expected position of objects based on the wireframe map 121. Moreover, because the AR viewer 200 has access to the wireframe map 121 of the entire gaming area 120, the AR viewer 200 can be aware of objects or destinations within the gaming area 120 that it has not itself scanned. Processing requirements on the AR viewer 200 may also be reduced because the wireframe map 121 is already available to the AR viewer 200.

In some embodiments, the wireframe map 121 may store various information about EGMs in the gaming area, such as the identity, type, orientation and location of various types of EGMs, the locations of exits, bathrooms, courtesy desks, cashiers, ATMs, ticket redemption machines, etc. Such information may be used by an AR viewer 200 to help the user navigate the gaming area. For example, if a user desires to find a destination within the gaming area, the user may ask the AR viewer 200 for directions using a built-in microphone and voice recognition function in the AR viewer 200 or use other hand gestures or eye/gaze controls tracked by the AR viewer 200 (instead of or in addition to voice control). The AR viewer 200 may process the request to identify the destination, and then may display a virtual object, such as a virtual path on the ground, virtual arrow, virtual sign, etc., to help the user to find the destination. In some embodiments, for example, the AR viewer 200 may display a halo or glow around the destination to highlight it for the user, or have virtual 3D sounds coming from it so players could more easily find the machine.

Mixed Reality Applications

According to some embodiments, a user of an AR viewer 200 may use the AR viewer to obtain information about players and/or EGMs on a casino gaming floor. The information may be displayed to the user on the AR viewer 200 in a number of different ways such as by displaying images on the AR viewer 200 that appear to be three dimensional or two dimensional elements of the scene as viewed through the AR viewer 200. In general, the type and/or amount of data that is displayed to the user may depend on what type of user is using the AR viewer 200 and, correspondingly, what level of permissions or access the user has. For example, an AR viewer 200 may be operated in one of a number of modes, such as a player mode, an observer mode or an operator mode. In a player mode, the AR viewer 200 may be used to display information about particular EGMs on a casino floor. The information may be generic information about an EGM or may be customized information about the EGM based on the identity or preferences of the user of the AR viewer 200. In an observer mode, the AR viewer 200 may be used to display information about particular EGMs on a casino floor or information about players of EGMs on the casino floor. In an operator mode, the AR viewer 200 may also be used to display information about particular EGMs on a casino floor or information about players of EGMs on the casino floor, but the information may be different or more extensive than the information displayed to an observer. Each of these situations is described in more detail below.

Figure 4A:
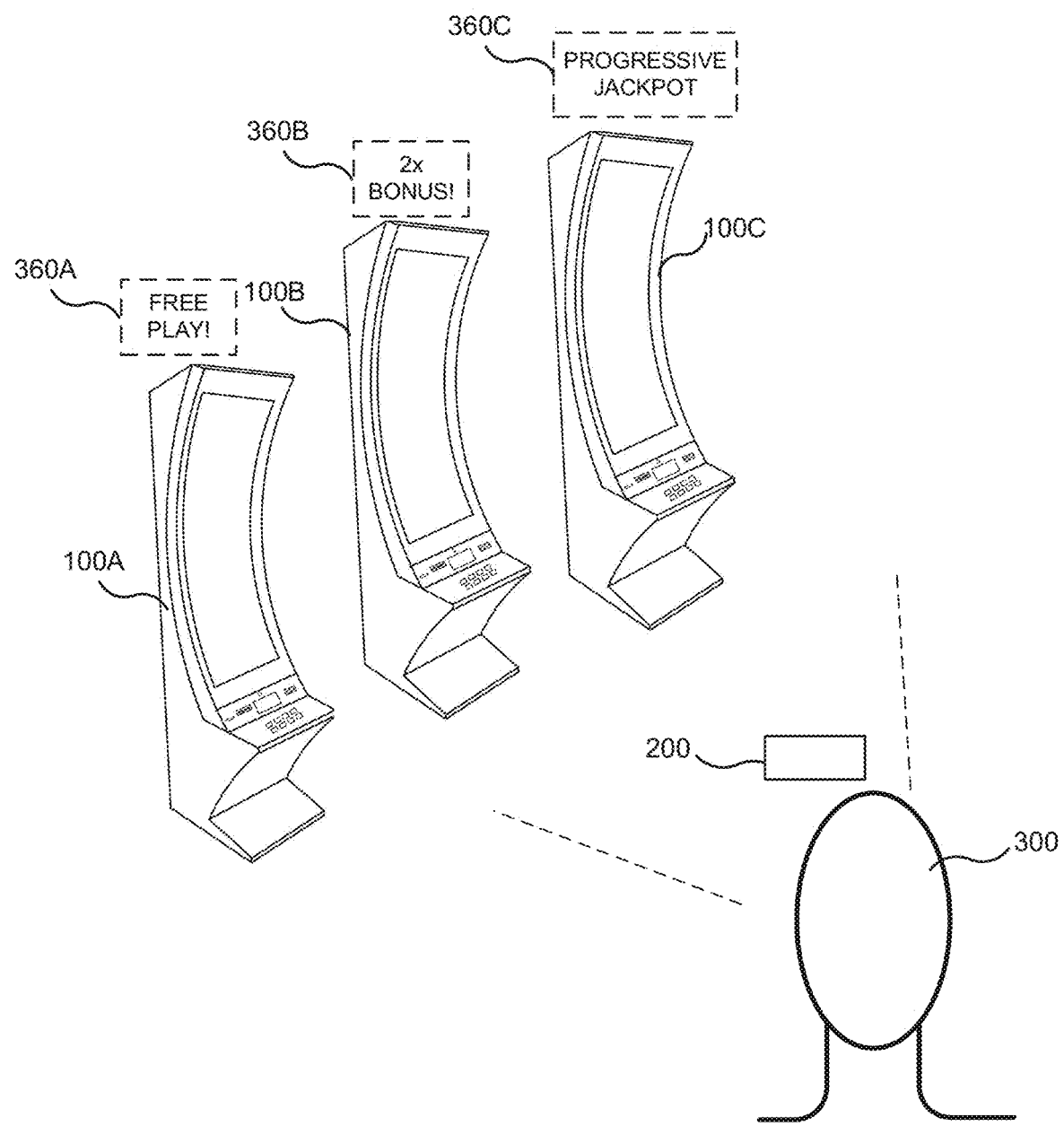
FIGS. 4A and 4B are perspective views illustrating players viewing groups of electronic gaming machines using an augmented reality viewer according to some embodiments.

FIG. 4A illustrates an example of the use of an AR viewer 200 in player mode. In the example shown in FIG. 4A, a player 300 may use an AR viewer 200 to view a casino floor area in which three EGMs 100A, 100B, 100C are located. The AR viewer 200 generates a live video signal of the casino floor including the three EGMs 100A, 100B, 100C, and using a digital map of the casino floor as described above, the AR viewer 200 may identify the three EGMs 100A, 100B, 100C. The AR viewer 200 may further communicate with the EGMs 100A, 100B, 100C over the wireless interface 202 and/or with the AR controller 70 over the wireless interface 204 shown in FIG. 1 to obtain information about the EGMs 100A, 100B, 100C, including information that is specific to the user of the AR viewer 200.

In some embodiments, the AR viewer 200 may transmit the live video signal and/or position/orientation data of the AR viewer 200 to the AR controller 70, and the AR controller 70 may use the video signal and/or the position/orientation data of the AR viewer 200 to identify EGMs visible in the live video signal. The AR controller 70 may provide information to the AR viewer 200 identifying the EGMs 100A, 100B, 100C along with information about the EGMs 100A, 100B, 100C that can be displayed on the AR viewer 200 as virtual images 360A, 360B, 360C in the video signal displayed to the user as illustrated in FIG. 4.

In some embodiments, the information about the EGMs 100A, 100B, 100C may include EGM-specific information that relates to features of the EGM, such as whether the EGM has a progressive jackpot associated with it (e.g., virtual image 360C) or that a special bonus or free play is being offered (e.g., virtual images 360A, 360B).

In some embodiments, the information displayed on the AR viewer 200 may be specific to the player 300. For example, when the AR viewer 200 is activated, it may register with the AR controller 70. As part of the registration process, the AR viewer 200 may identify the player 300 that is using the AR viewer 200 to the AR controller 70. Using the player identification information provided by the AR viewer 200, the AR controller 70 may query the player tracking server 45 (FIG. 1) to obtain information about the player 300. The AR controller 70 may receive information from the player tracking server 45 about the player's reward status and/or past game play, and may generate special offers that are unique to the player 300 based on the player's reward status and/or past game play. Thus, for example, the AR controller 70 may determine that the player 300 is entitled to free play on a particular EGM 10A. The AR controller 70 communicates this to the AR viewer 200, which responsively displays the message 360A ("Free Play!") alongside the image of the EGM 10A in the video signal shown to the player 300.

Figure 4B:
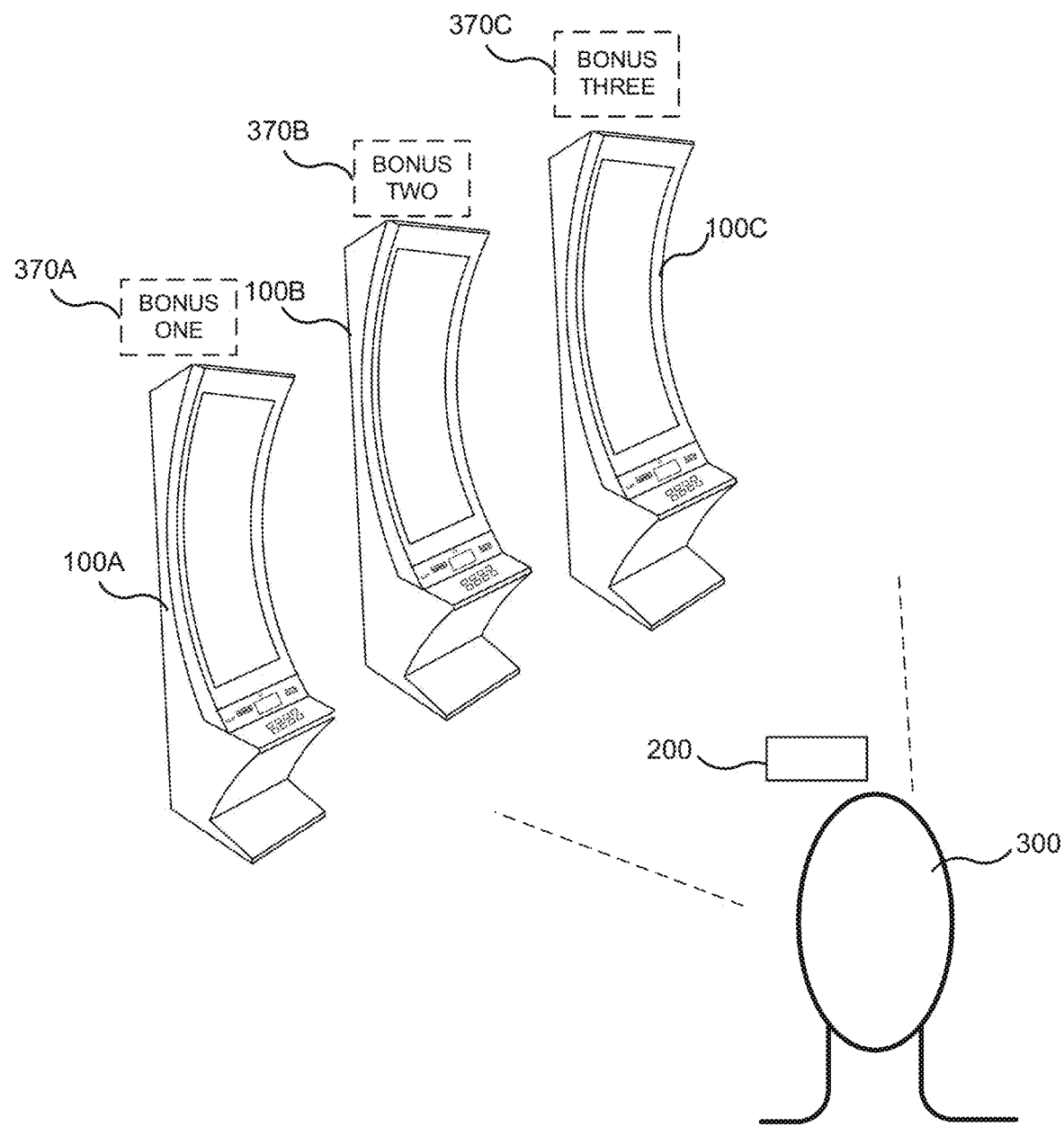

Referring to FIG. 4B, AR messages may be displayed to a player to entice the player to use different EGMs by, for example, offering bonuses to the player to play different EGMs, or to play EGMs in a particular order. For example, referring to FIG. 4B, an AR viewer 200 may display information to a player 300 indicating that progressive bonuses are available to the player on EGMs 100A, 100B, 100C if the player plays the EGMs in order. For example, informational messages 370A, 370B, 370C may be displayed to the player indicating that the player may be eligible for a first bonus by playing the first EGM 100A, a second bonus by playing the second EGM 100B, and a third bonus by playing the EGM 100C. The bonus may be made available if the player plays the EGMs for a predefined period of time or by wagering a predefined total amount on each EGM. The bonus may increase with each machine. In this manner, AR may be used to encourage a player to try new or different machines.

Still other informational messages about EGMs could be displayed to a player using AR informational messages, such as a total amount of player reward points that a player may earn for playing a particular machine, a countdown timer indicating how long a particular bonus, award or other promotion will last on a particular machine, etc.

Figure 5:
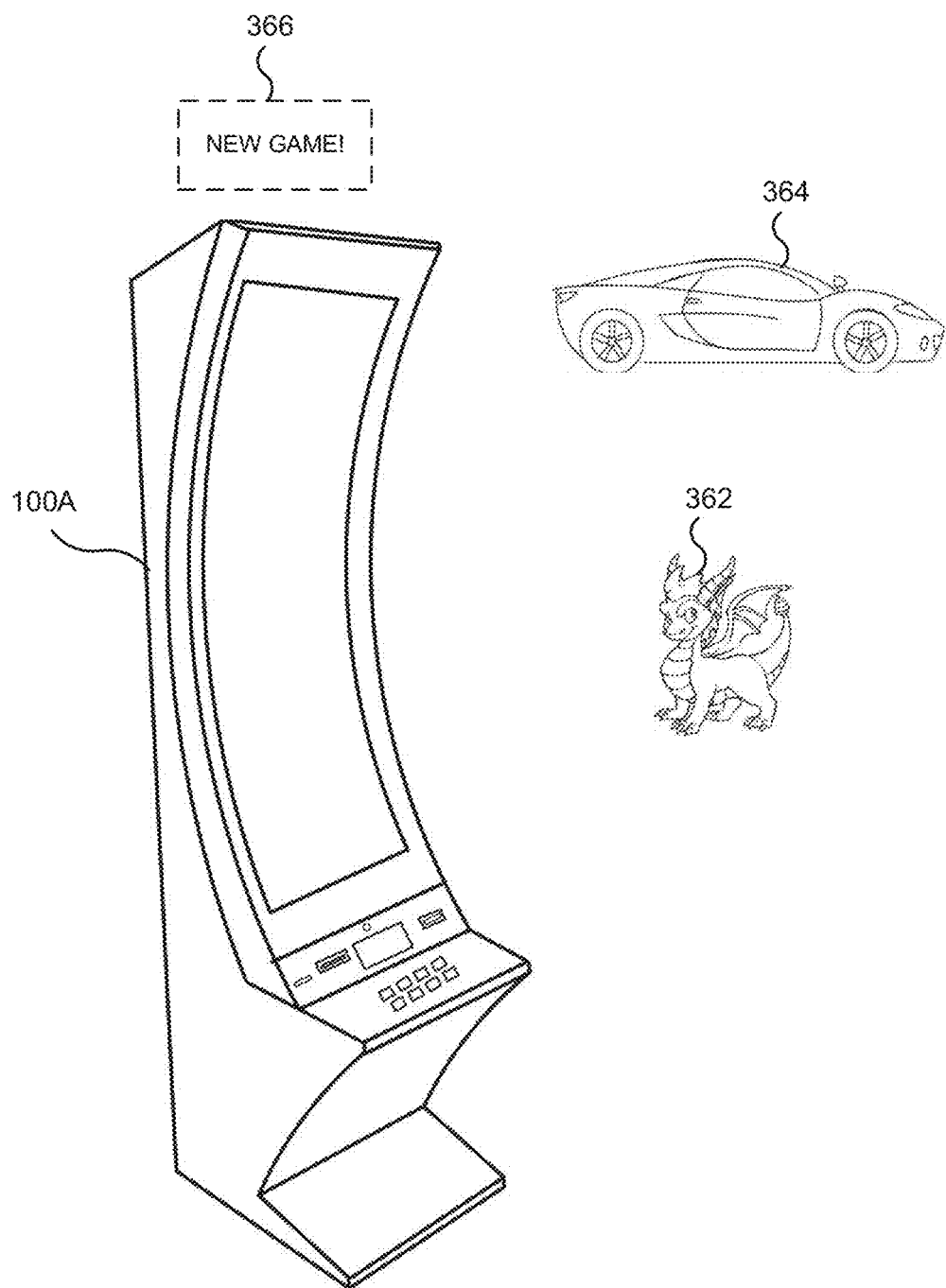
FIG. 5 illustrates an example of a view of an electronic gaming machine as seen using an augmented reality viewer according to some embodiments.

In some embodiments, the information about the EGMs 100A, 100B, 100C may include other player-specific information that is unique to the player, such as information about the player's past performance on the machine, the fact that the player has played or not played the EGM before, etc. In addition, as illustrated in FIG. 5, the AR viewer 200 may display images or avatars associated with a player 300 and an EGM 100A, such as the images 362, 364, or informational message 366 shown in FIG. 5. For example, if the EGM 100A has a game that includes a race car avatar that can be upgraded by the player based on the player's game play or purchased upgrades, the AR viewer 200 may display the highest level or most recently used race car avatar belonging to the player on the EGM 100A.

The informational message 366 shown in FIG. 5 indicates that the EGM 100A is a new game to entice the player to try it out.

Figure 6:
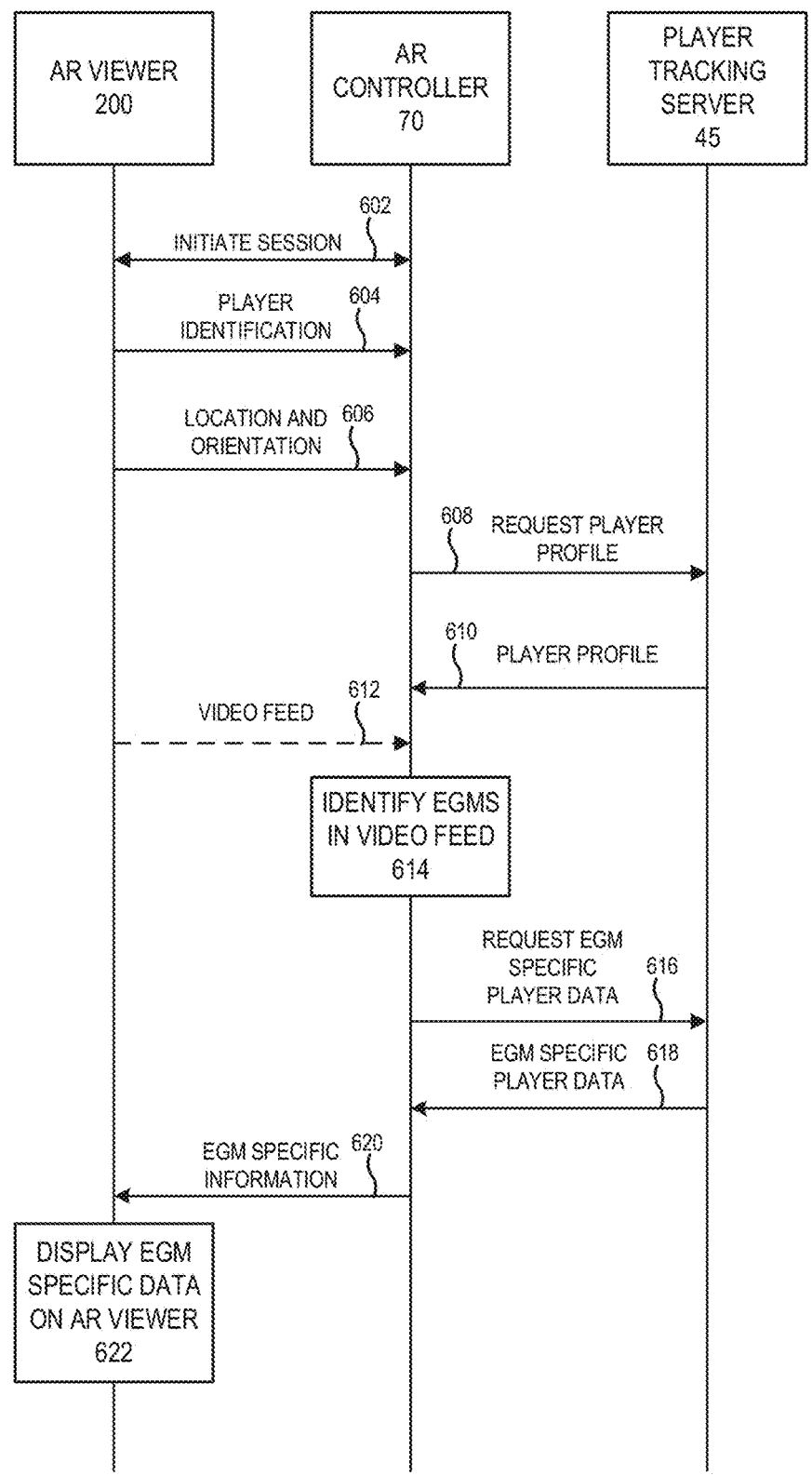
FIG. 6 is a flow diagram illustrating message flows according to some embodiments.

FIG. 6 illustrates an example of message flows between an AR viewer 200, an AR controller 70 and a player tracking server 45 according to some embodiments. As shown therein, operations commence when an AR viewer 200 initiates a session by registering its presence with an AR controller 70 (arrow 602). As part of the session initiation procedure, the AR viewer 200 may identify the user of the AR viewer to the AR controller 70, for example, by providing a user name or player reward number associated with the player (arrow 604).

The AR viewer 200 may also provide information to the AR controller regarding the current position and/or orientation of the AR viewer 200 (arrow 606). Position information may include GPS coordinates, location coordinates generated by a private asset tracking system, or other coordinates that locate the AR viewer 200 in three-dimensional space. The information may also include orientation information (e.g., direction of orientation, yaw, pitch, roll, etc.) that indicates the angle that the AR viewer 200 is facing. Using this information, the AR controller 70 may determine the location of the AR viewer 200 and determine which EGMs are nearby.

Using the player identification information, the AR controller 70 sends a query to the player tracking server 45 (arrow 608) requesting information about the player, such as information relating to the player's game play history with respect to EGMs operated by the game operator to which the EGMs belong. The player tracking server 45 provides the information to the AR controller 70 in the form of a player profile (arrow 610). It will be appreciated that this query/response action between the AR controller 70 and the player tracking server 45 may be performed multiple times. For example, the query/response action between the AR controller 70 and the player tracking server 45 may be performed to obtain information about the player's status with respect to a particular EGM.

Still referring to FIG. 6, the AR viewer 200 may optionally provide a live video feed to the AR controller 70 (arrow 612), from which the AR controller 70 may identify EGMs visible within the video signal (block 614). In some cases, the AR viewer 200 itself may identify EGMs visible in the video using a stored wireframe map as described above. In either case, once the AR controller 70 identifies EGMs near the AR viewer 200, the AR controller may request EGM specific player data for one or more of the EGMs from the player tracking server 45 (arrow 616). The player tracking server retrieves such information from the player database 47 (FIG. 1) and transmits it to the AR controller 70 (arrow 618).

At least some of the EGM specific player information is then transmitted by the AR controller 70 to the AR viewer 200 (arrow 620), which displays the EGM specific data as a virtual image in the video signal shown to the player (block 622).

Figure 7:
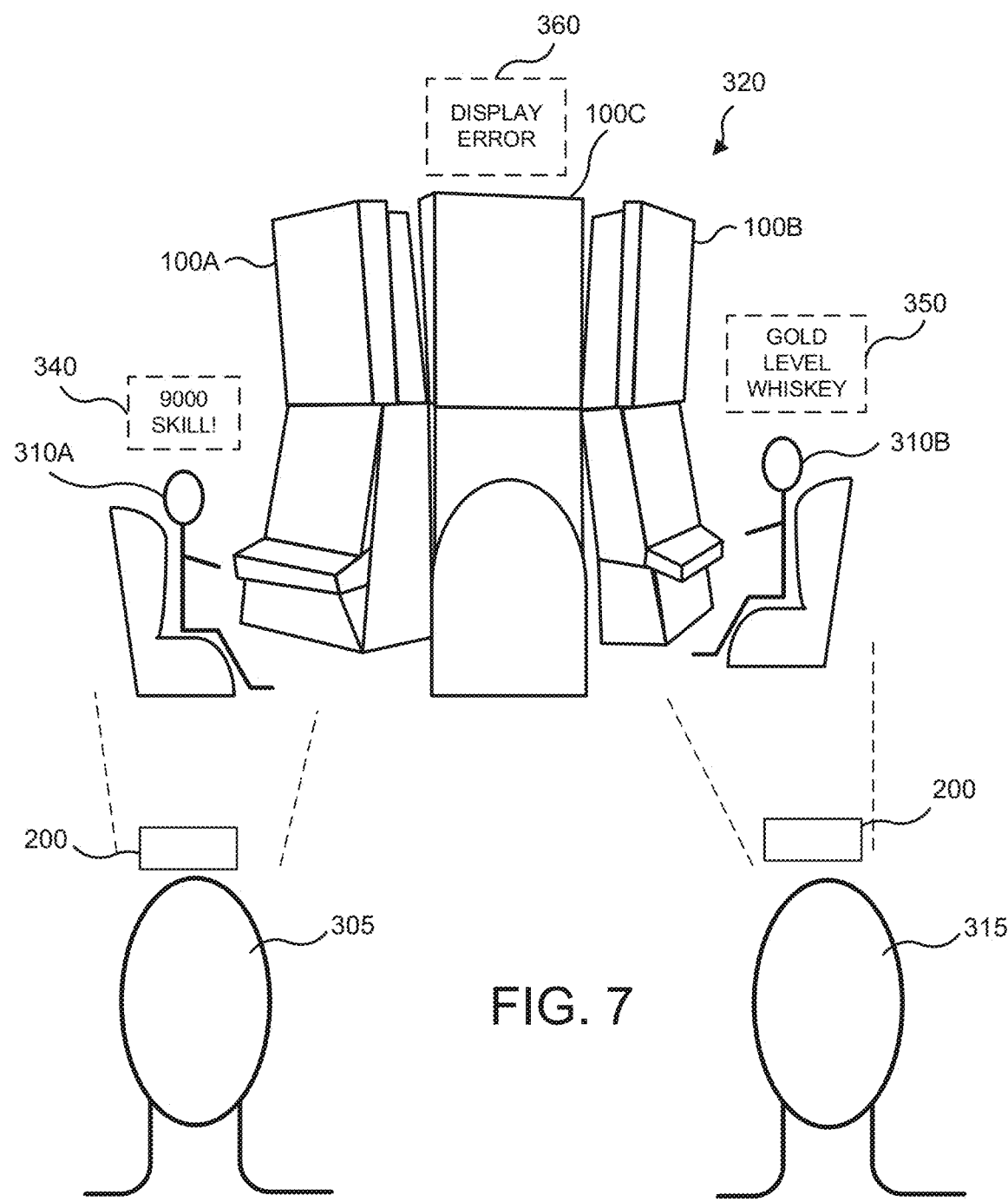
FIG. 7 is a perspective view illustrating users viewing a group of electronic gaming machines using augmented reality viewers according to some embodiments.

FIG. 7 illustrates the use of AR viewers 200 in observer mode and operator mode. In operator mode, an AR viewer 200 may be used by, for example, a casino operator to obtain and present enhanced information about casino players and/or EGMs to a casino employee, such as a floor manager, security officer, bartender, waitress, game attendant, or other personnel. FIG. 7 illustrates a bank 320 of EGMS 100A, 100B, 100C in a casino gaming area. A player 310B is seated at and playing the EGM 100B. A casino employee 315 may view the bank 320 of EGMs including the player 310B at the EGM 100B using an AR viewer 200. The AR viewer 200 may communicate with the AR controller 70 to determine an identity of the player 310B. The AR controller 70 may obtain information about the player from, for example, the player tracking server 45, and may transmit the information to the AR viewer 200, which may display the information to the casino employee as an AR image 350 in the video signal captured by the AR viewer 200. The information about the player may be any information that is relevant to the casino operator, such as the player's reward status level, favorite drink, game type preference, gaming machine preference, a wager preference, player skill level, hotel preference, player host name, etc.

Other information that could be displayed about a player includes information associated with both the player and the EGM he or she is playing, including total coin-in, amount wagered, amount won, amount lost, total wins, total losses, total plays, time on machine, and total return to player.

The AR viewer 200 may also display a message adjacent the player indicating that the player needs assistance, for example, if the player has pressed a "call attendant" button on the EGM.

In addition, a casino employee may use the AR viewer 200 to view information about the EGMs 100A, 100B, 100C that casino patrons cannot see. For example, the AR viewer 200 may display information about the status of an EGM, such as an error code, an error message, a malfunction code, machine diagnostic information, and/or machine service information about an EGM. For example, as shown in FIG. 7, the casino employee 315 may see an error message 360 over the EGM 100C that indicates that the EGM 100C is suffering from a display error. Any other desired error message, service code or other service information could be displayed to the casino employee 315 using an AR viewer 200.

In a similar manner, other relevant information may be displayed to an observer 305 using an AR viewer 200 while watching another player 310A play an EGM 100A. Information that may be relevant to another player may be, for example, a skill level or winning percentage of the observed player 310A. Such information may be used by the observer for back betting, as described below. It will be appreciated that a casino operator may allow the observed player to control which information about him or her is made visible to observers.

Figure 8:
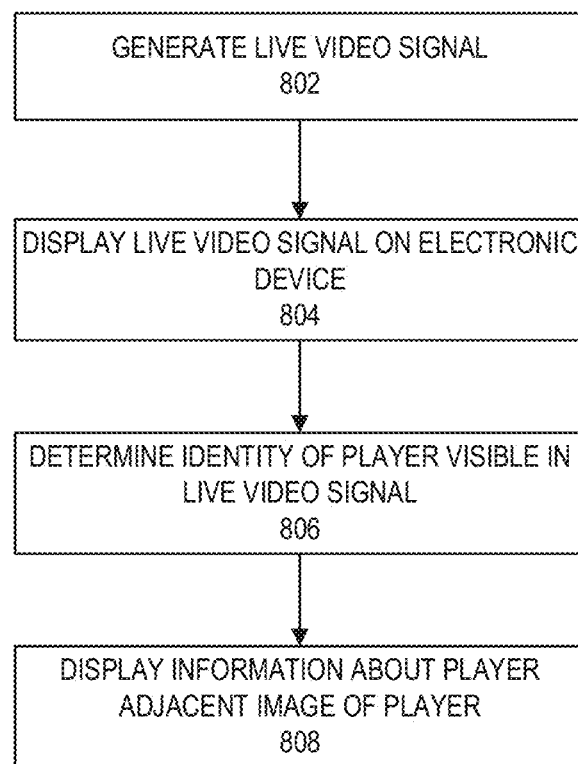
FIGS. 8-10 are flowcharts illustrating operations of systems/methods according to some embodiments.

FIG. 8 illustrates operations of an AR viewer 200 in observer or operator mode in which information about a player is displayed to the user of the AR viewer. As shown therein, an AR viewer 200 generates a live video signal using, for example, a digital image sensor in the AR viewer 200 (block 802). The live video signal is displayed to a user of the AR viewer 200, for example, on a display screen of the AR viewer 200 (block 804). The AR viewer 200 determines the identity of a player who is visible in the live video signal, possibly with the assistance of an AR controller 70 and player tracking server 45 (block 806). The AR viewer 200 then displays information about the identified player in the live video signal adjacent the image of the player in the live video signal (block 808).

Figure 9:
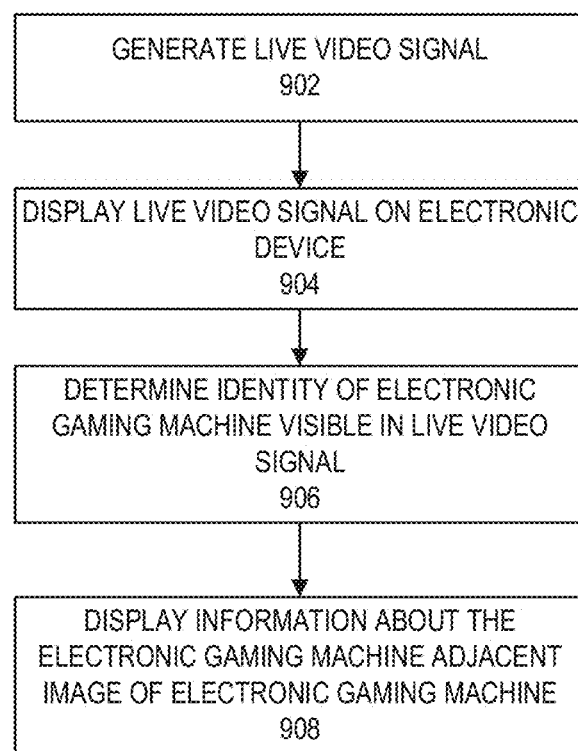

FIG. 9 illustrates operations of an AR viewer 200 in a player, observer or operator mode in which information about an EGM is displayed to the user of the AR viewer. As shown therein, an AR viewer 200 generates a live video signal using, for example, a digital image sensor in the AR viewer 200 (block 902). The live video signal is displayed to a user of the AR viewer 200, for example, on a display screen of the AR viewer 200 (block 904). The AR viewer 200 determines the identity of an EGM that is visible in the live video signal, possibly with the assistance of an AR controller 70 (block 906). The AR viewer 200 then displays information about the identified EGM in the live video signal adjacent the image of the EGM in the live video signal (block 908).

Figure 10:
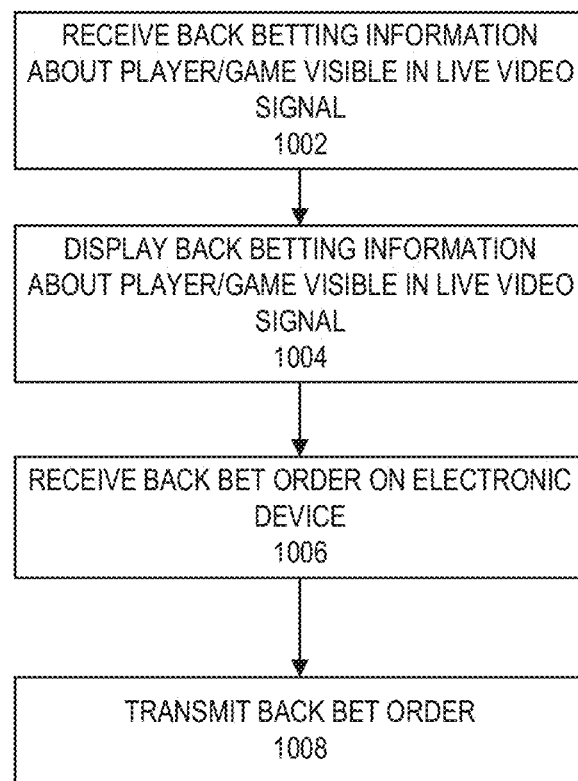

FIG. 10 illustrates the use of an AR viewer for back betting in an observer mode after a player that is visible in the live video signal generated by the AR viewer 200 has been identified. In some games, and in particular in skill based games or games in which players compete head to head, it may be possible for a casino to accept back bets by an observer on the outcome of a game played by a different player. For example, assume that a player is playing a head-to-head skill based racing game against other competitors. An observer watching the competition may desire to place a bet for or against a particular player in the game. An AR viewer 200 according to some embodiments may facilitate back betting by providing information to the observer about the player and then by allowing the observer to place a back bet that is transmitted to the casino. It will be appreciated that even in non-skill based games there may be a demand for back betting. These systems/methods can be used to accept back bets in such situations as well.

Referring to FIG. 10, operations may include receiving, at an AR viewer 200, back betting information about a player or game that is visible in a live video signal generated by an AR viewer 200 (block 1002). Back betting information may include information regarding the types of bets available, the odds line on available bets, a skill ranking or level of the player, a win/loss ratio of the player, or any other information that may be useful to the back bettor. The AR viewer 200 then displays the back betting information to the user of the AR viewer 200 as part of the live video signal (block 1004). For example, by watching using the AR viewer 200, the observer/back bettor may see back betting information superimposed over the player or adjacent the player in the video signal. High level players or recent winners could be highlighted in the video signal. Recent statistics and names of winners could be superimposed on or adjacent an EGM.

When the observer/back bettor is ready to place a back bet, he or she may enter the bet into the AR viewer 200, which receives the back bet order (block 1006). The AR viewer 200 then transmits (block 1008) the back bet to a back bet server 60 (FIG. 1), which receives and processes the back bet.

Electronic Gaming Machines

Figure 11A:
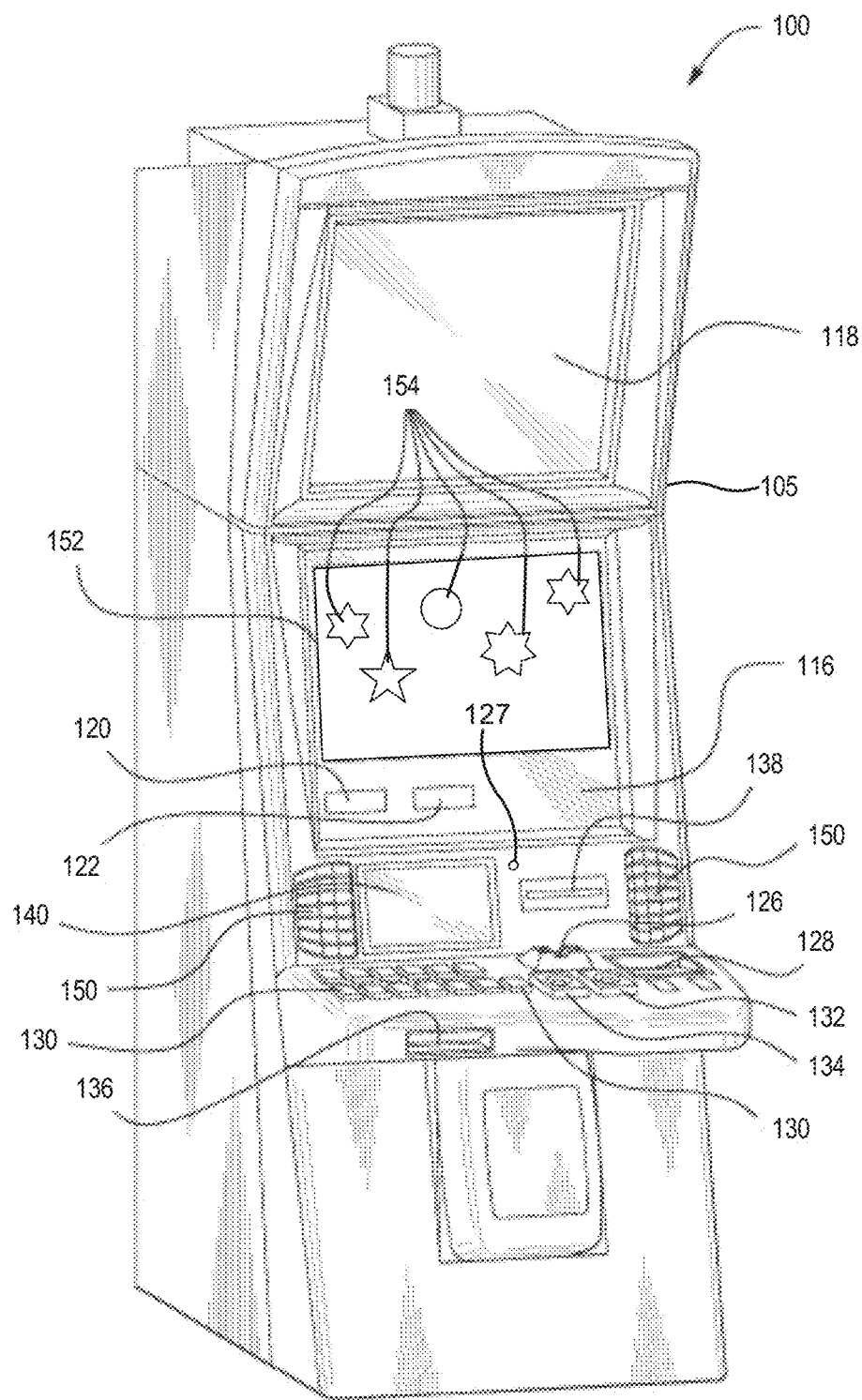
FIG. 11A is a perspective view of an electronic gaming device that can be configured according to some embodiments.
Figure 11B:
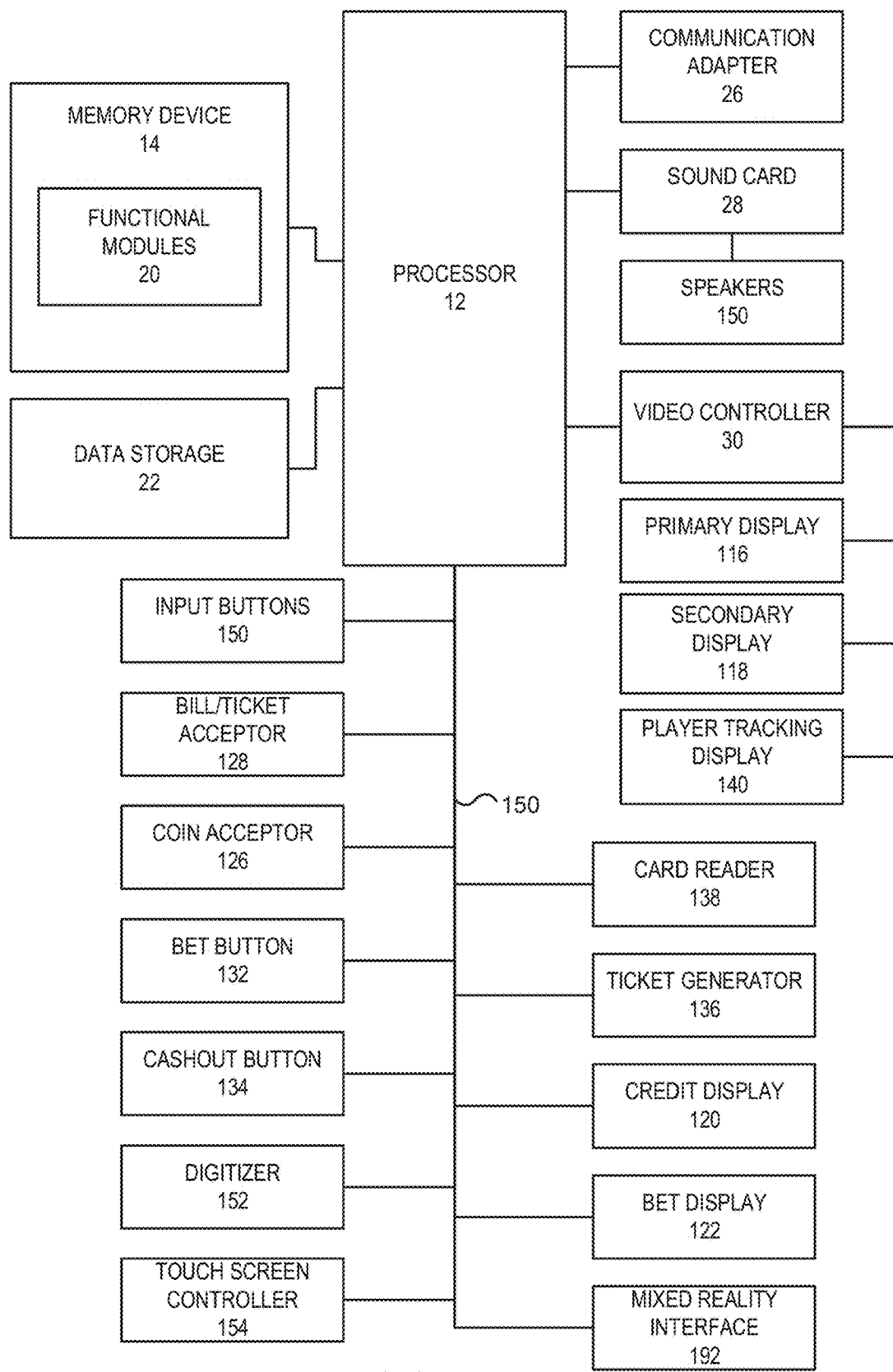
FIG. 11B is a schematic block diagram illustrating an electronic configuration for a gaming device according to some embodiments.
Figure 11C:
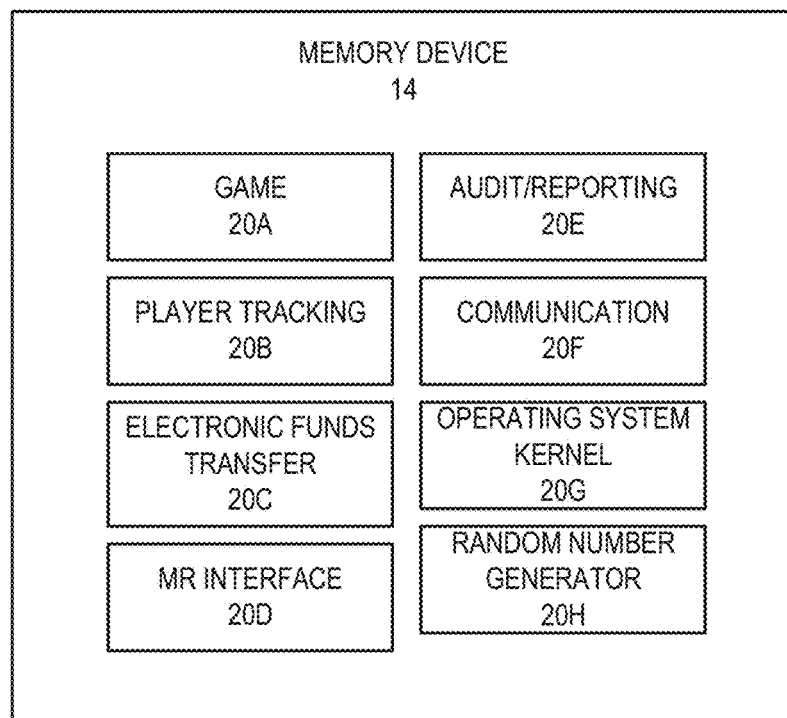
FIG. 11C is a block diagram that illustrates various functional modules of an electronic gaming device according to some embodiments.

An example of an electronic gaming machine (EGM) that can interact with mixed reality viewers according to various embodiments is illustrated in FIGS. 10A, 10B, and 10C in which FIG. 11A is a perspective view of an EGM 100 illustrating various physical features of the device, FIG. 11B is a functional block diagram that schematically illustrates an electronic relationship of various elements of the EGM 100, and FIG. 11C illustrates various functional modules that can be stored in a memory device of the EGM 100. The embodiments shown in FIGS. 10A to 10C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs typically include a number of standard features, many of which are illustrated in FIGS. 10A and 10B. For example, referring to FIG. 11A, an EGM 100 may include a support structure, housing or cabinet 105 which provides support for a plurality of displays, inputs, outputs, controls and other features that enable a player to interact with the EGM 100.

The EGM 100 illustrated in FIG. 1A includes a number of display devices, including a primary display device 116 located in a central portion of the cabinet 105 and a secondary display device 118 located in an upper portion of the cabinet 105. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered.

The player tracking display 140 may be used to display a service window that allows the player to interact with, for example, their player loyalty account to obtain features, bonuses, comps, etc. In other embodiments, additional display screens may be provided beyond those illustrated in FIG. 11A.

The EGM 100 may further include a number of input devices that allow a player to provide various inputs to the EGM 100, either before, during or after a game has been played. For example, the EGM 100 may include a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 11A and 10B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices of the EGM 100 are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 11B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 11B, operation of the primary display device 116, the secondary display device 118 and the player tracking display 140 may be controlled by a video controller 30 that receives video data from a processor 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor 12. In some embodiments however, the credit display 120 and/or the bet display 122 may be driven by the video controller 30.

Referring again to FIG. 11A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touch-screen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the EGM 100 are generally configured to display one or more game and/or non-game images, symbols, and indicia.

In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

While not illustrated in FIG. 11A, the EGM 100 may also include a note dispenser configured to dispense paper currency and/or a coin generator configured to dispense coins or tokens in a coin payout tray.

The EGM 100 may further include one or more speakers 150 controlled by one or more sound cards 28 (FIG. 11B). The EGM 100 illustrated in FIG. 11A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 11B is a block diagram that illustrates logical and functional relationships between various components of an EGM 100. As shown in FIG. 11B, the EGM 100 may include a processor 12 that controls operations of the EGM 100. Although illustrated as a single processor, multiple special purpose and/or general purpose processors and/or processor cores may be provided in the EGM 100. For example, the EGM 100 may include one or more of a video processor, a signal processor, a sound processor and/or a communication controller that performs one or more control functions within the EGM 100. The processor 12 may be variously referred to as a "controller," "microcontroller," "microprocessor" or simply a "computer." The processor may further include one or more application-specific integrated circuits (ASICs).

Various components of the EGM 100 are illustrated in FIG. 11B as being connected to the processor 12. It will be appreciated that the components may be connected to the processor 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 11D.

The memory device 14 may store program code and instructions, executable by the processor 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferro-electric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor through a universal serial bus (USB) hub (not shown) connected to the processor 12. U.S. Patent Application Publication No. 2004/0254014 describes a variety of EGMs including one or more communication ports that enable the EGMs to communicate and operate with one or more external peripherals.

In some embodiments, the EGM 100 may include a sensor, such as a camera in communication with the processor 12 (and possibly controlled by the processor 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processor 12 may incorporate that image into the primary and/or secondary game as a game image, symbol or indicia.

Various functional modules of that may be stored in a memory device 14 of an EGM 100 are illustrated in FIG. 11C. Referring to FIG. 11C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back end server or financial institution to transfer funds to and from an account associated with the player. The wide area progressive (WAP) interface module 20D interacts with a remote WAP server to enable the EGM 100 to participate in a wide area progressive jackpot game as described in more detail below. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In some embodiments, an EGM 100 may be implemented by a desktop computer, a laptop personal computer, a personal digital assistant (PDA), portable computing device, or other computerized platform. In some embodiments, the EGM 100 may be operable over a wireless network, such as part of a wireless gaming system. In such embodiments, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 11D:
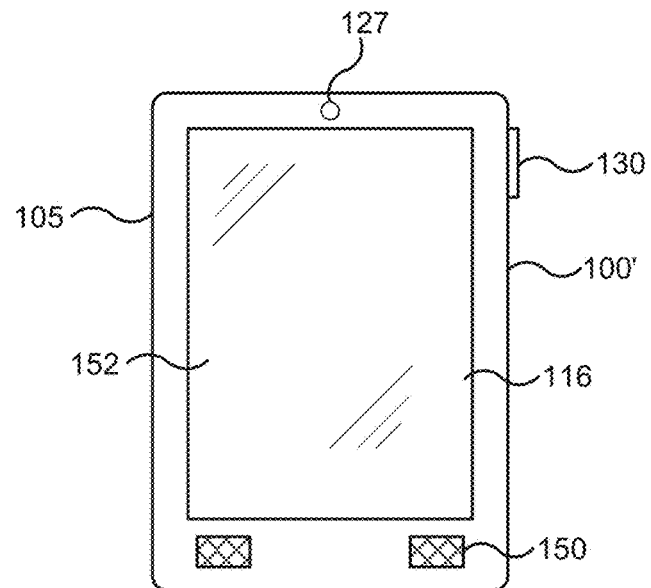
FIG. 11D is perspective view of a handheld electronic gaming device that can be configured according to some embodiments.

For example, referring to FIG. 11D, an EGM 100' may be implemented as a handheld device including a compact housing 105 on which is mounted a touchscreen display device 116 including a digitizer 152. An input button 130 may be provided on the housing and may act as a power or control button. A camera 127 may be provided in a front face of the housing 105. The housing 105 may include one or more speakers 150. In the EGM 100', various input buttons described above, such as the cashout button, gameplay activation button, etc., may be implemented as soft buttons on the touchscreen display device 116. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 11E:
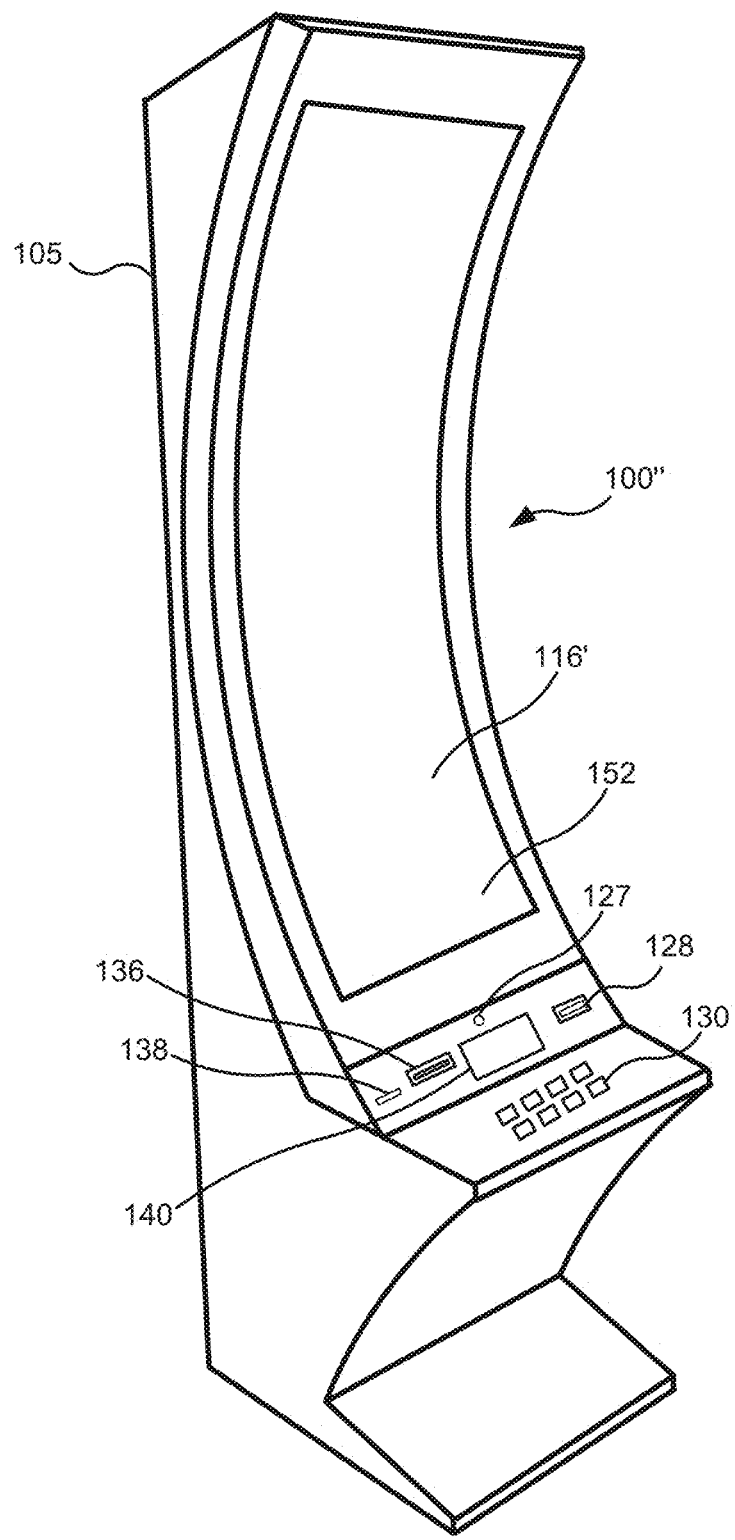
FIG. 11E is a perspective view of an electronic gaming device according to further embodiments.

FIG. 11E illustrates a standalone EGM 100" having a different form factor from the EGM 100 illustrated in FIG. 11A. In particular, the EGM 100" is characterized by having a large, high aspect ratio, curved primary display device 116' provided in the housing 105, with no secondary display device. The primary display device 116' may include a digitizer 152 to allow touchscreen interaction with the primary display device 116'. The EGM 100" may further include a player tracking display 140, a plurality of input buttons 130, a bill/ticket acceptor 128, a card reader 138, and a ticket generator 136. The EGM 100" may further include one or more cameras 127 to enable facial recognition and/or motion tracking.

Figure 12:
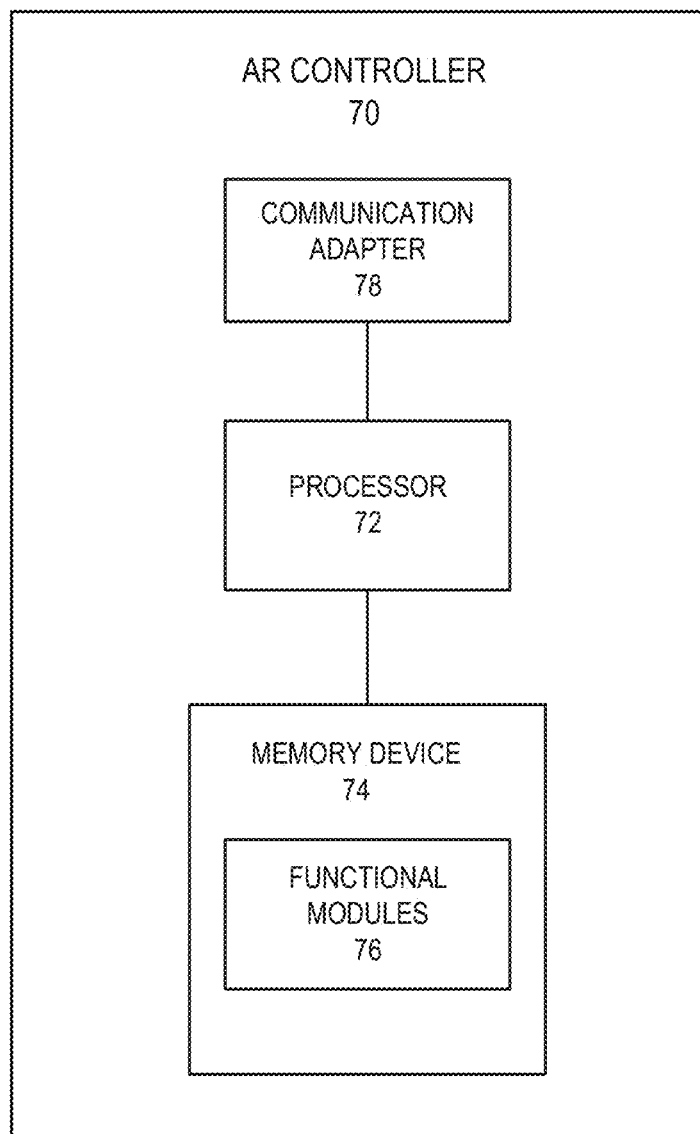
FIG. 12 is a schematic block diagram illustrating an electronic configuration for an augmented reality controller according to some embodiments.

FIG. 12 is a block diagram that illustrates various components of an AR controller 70 according to some embodiment. As shown in FIG. 12, the AR controller 70 may include a processor 72 that controls operations of the AR controller 70. Although illustrated as a single processor, multiple special purpose and/or general purpose processors and/or processor cores may be provided in the AR controller 70. For example, the EGM 100 may include one or more of a video processor, a signal processor, a sound processor and/or a communication controller that performs one or more control functions within the EGM 100. The processor 72 may be variously referred to as a "controller," "microcontroller," "microprocessor" or simply a "computer." The processor may further include one or more application-specific integrated circuits (ASICs).

Various components of the AR controller 70 are illustrated in FIG. 12 as being connected to the processor 72. It will be appreciated that the components may be connected to the processor 72 through a system bus, a communication bus and controller, such as a USB controller and USB bus, a network interface, or any other suitable type of connection.

The AR controller 70 further includes a memory device 74 that stores one or more functional modules 76 for performing the operations described above.

The memory device 74 may store program code and instructions, executable by the processor 72, to control the AR controller 70. The memory device 74 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The AR controller 70 may include a communication adapter 78 that enables the AR controller 70 to communicate with remote devices, such as EGMs 100 and/or a player tracking server 45 (FIG. 1) over a wired and/or wireless communication network, such as a local area network (LAN), wide area network (WAN), cellular communication network, or other data communication network.

The EGM 100 may include one or more internal or external communication ports that enable the processor 72 to communicate with and to operate with internal or external peripheral devices, such as display screens, keypads, mass storage devices, microphones, speakers, and wireless communication devices. In some embodiments, internal or external peripheral devices may communicate with the processor through a universal serial bus (USB) hub (not shown) connected to the processor 72.

Providing Player Action Recommendations

Figure 13:
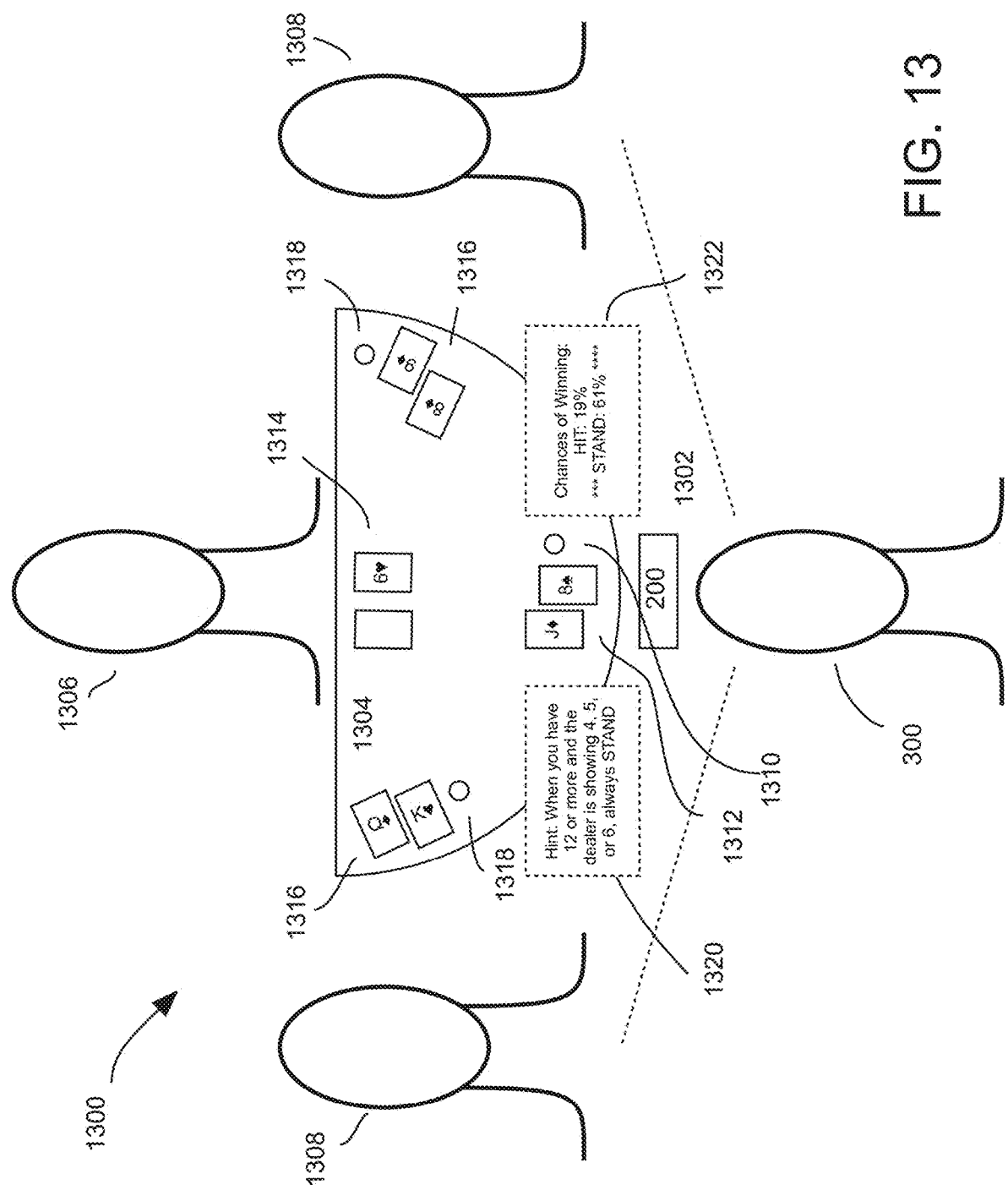
FIG. 13 is a view illustrating a user viewing an indication of a player action recommendation using an augmented reality viewer as part of a live game according to an embodiment.

Embodiments may provide player action recommendations, such as hints or instruction, to a player of a game. FIG. 13 is a view illustrating an AR system 1300 comprising an AR viewer 200 worn by a user 300 so as to provide an AR or mixed reality scene 1302 associated with a field of view of the user 300. In this embodiment, the scene 1302 includes real world elements such as a gaming table 1304 (a blackjack table in this example), a dealer 1306, and other players 1308 at the table 1304. A player's hand 1310 associated with the user 200 and player's wager 1312 is on the table 1304, as are a dealer's hand 1314 and other player's hands 1316 and wagers 1318.

The AR system 1300 generates a live video signal of the scene 1302, via the AR viewer for example, and determines, based on the live video signal, values for the player's hand 1310 and wager 1312 and the dealer's hand 1314. The AR system 1300 can also determine values for the other player's hands 1316 and wagers 1318 as well. Based on these determined values, the AR system determines a player action recommendation for the user 300 in real time and displaying an indication of the player action recommendation to the user 300 in real time via the AR viewer. In this example, the AR system 1300 provides an AR message 1320 providing strategy advice to the user 200, based on basic blackjack strategy for example, and another AR message 1322 providing information regarding the odds of winning based on different player actions. The player action recommendation may also be based on information from previous hands, such as a running count of cards associated with various card-counting methods.

In some embodiments, the player action recommendation may be provided using additional visual and/or audio elements. For example, the player action recommendation may include videos, gestures, animations, and/or other elements, and may also include an instructor avatar provided as part of the scene 1302. The player action recommendation may also provide instruction on how to use features of the game, such as player gestures, wherein visual and/or audio effects are provided to explain and show how to perform various gestures that may in turn be used to interact with the game. The AR system 1300 can be customized to provide the player action recommendation in a preferred language based on a preference of the user 200.

While the above example is directed to providing player action recommendations to a blackjack player, it should be understood that these features may be used with other games as well, such as a poker hand, a craps roll, or a roulette spin for example. For example, the player action recommendation comprises an indication of odds of an outcome related to a poker hand, such as an indication of odds of the player winning the hand, or pot odds for a poker hand based on odds of the player winning the hand, a pot size, and a wager size. The player action recommendation may also be based on determining a behavior of an opponent, such as determining a likelihood that an opponent is bluffing, based on behavior in the current hand and/or behavior in previous hands for example. Based on the previous outcomes, a trend in outcomes may be determined and provided to the user 200 via the AR system 1300.

Display of Remote and Virtual Players and Spectators

Figure 14A:
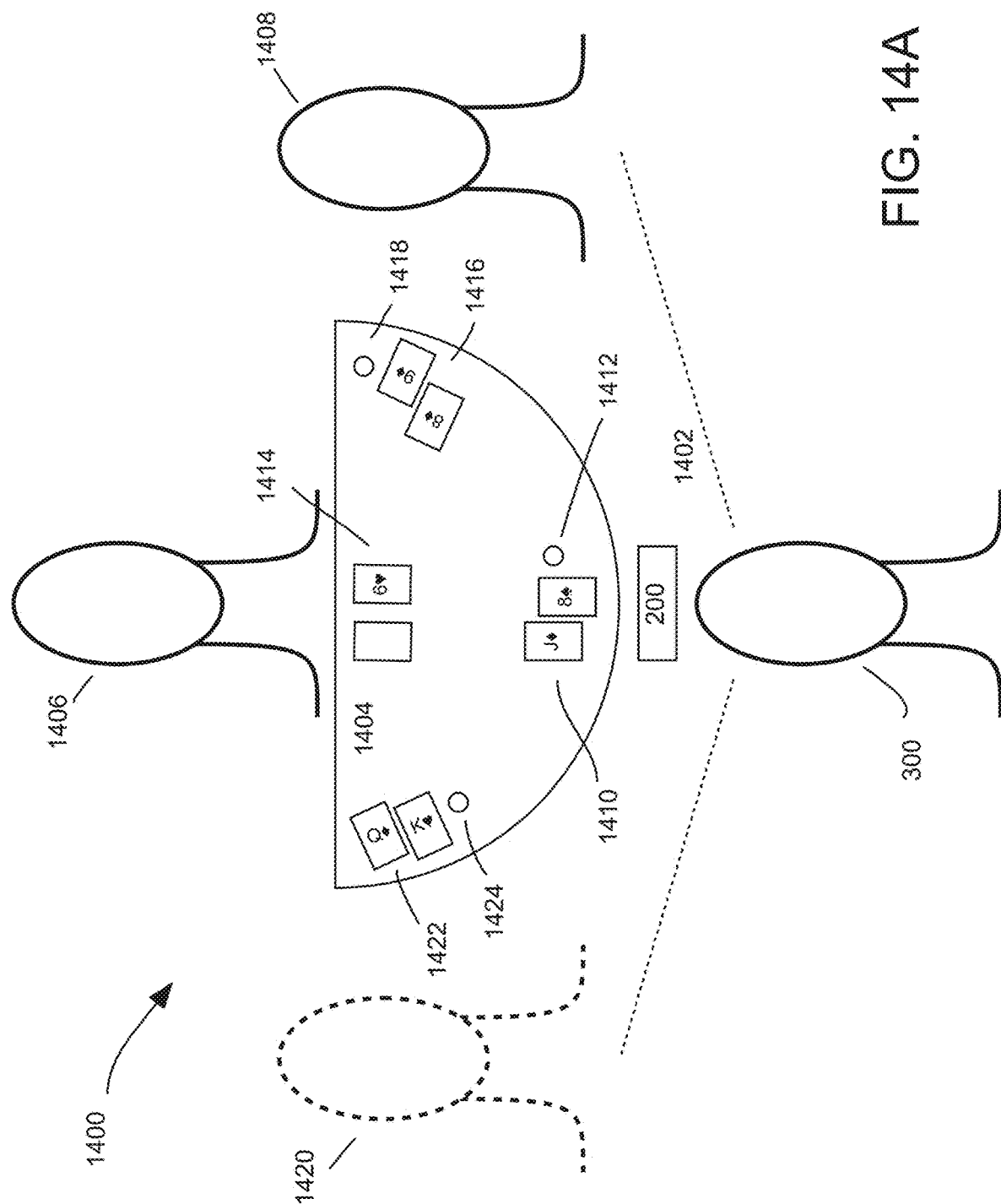
FIG. 14A is a view illustrating a first player viewing an avatar of a remote second player using an augmented reality viewer as part of a live game according to an embodiment.

Embodiments may provide representations of virtual or remote players or spectators as part of an AR scene. In this regard, FIG. 14A is a view illustrating an AR system 1400 comprising an AR viewer 200 worn by a user 300 so as to provide an AR or mixed reality scene 1402 associated with a field of view of the user 300. In this embodiment, the scene 1402 includes real world elements such as a gaming table 1404 (a blackjack table in this example), a dealer 1406, and another player 1408 at the table 1404. A player's hand 1410 associated with the user 200 and player's wager 1412 is on the table 1304, as are a dealer's hand 1414 and other player's hand 1416 and wager 1418. In addition to these real world elements, the AR system 1400 also provides an AR representation of a remote player 1420, i.e., a remote player avatar, so that it appears that the remote player 1420 is sitting at the same gaming table as the user 300, the dealer 1406 and the other player 1408. In this embodiment, the remote player's hand 1422 and/or wager 1424 may be real world elements, which are manipulated by the dealer for example, or may be virtual AR elements, as desired.

It should be understood that the remote player 1420 may not necessarily be another live player. Instead, the remote player 1420 may be a virtual player controlled by the AR system 1400 or another system. Alternatively, or in addition, the AR system may display non-player representations, i.e. spectator avatars, to the user 300 as part of the scene 1402. The spectators may be representations of remote spectators associated with actual people viewing the game or may be virtual spectators or a virtual crowd controlled by the AR system 1400 or other system, as desired.

Figure 14B:
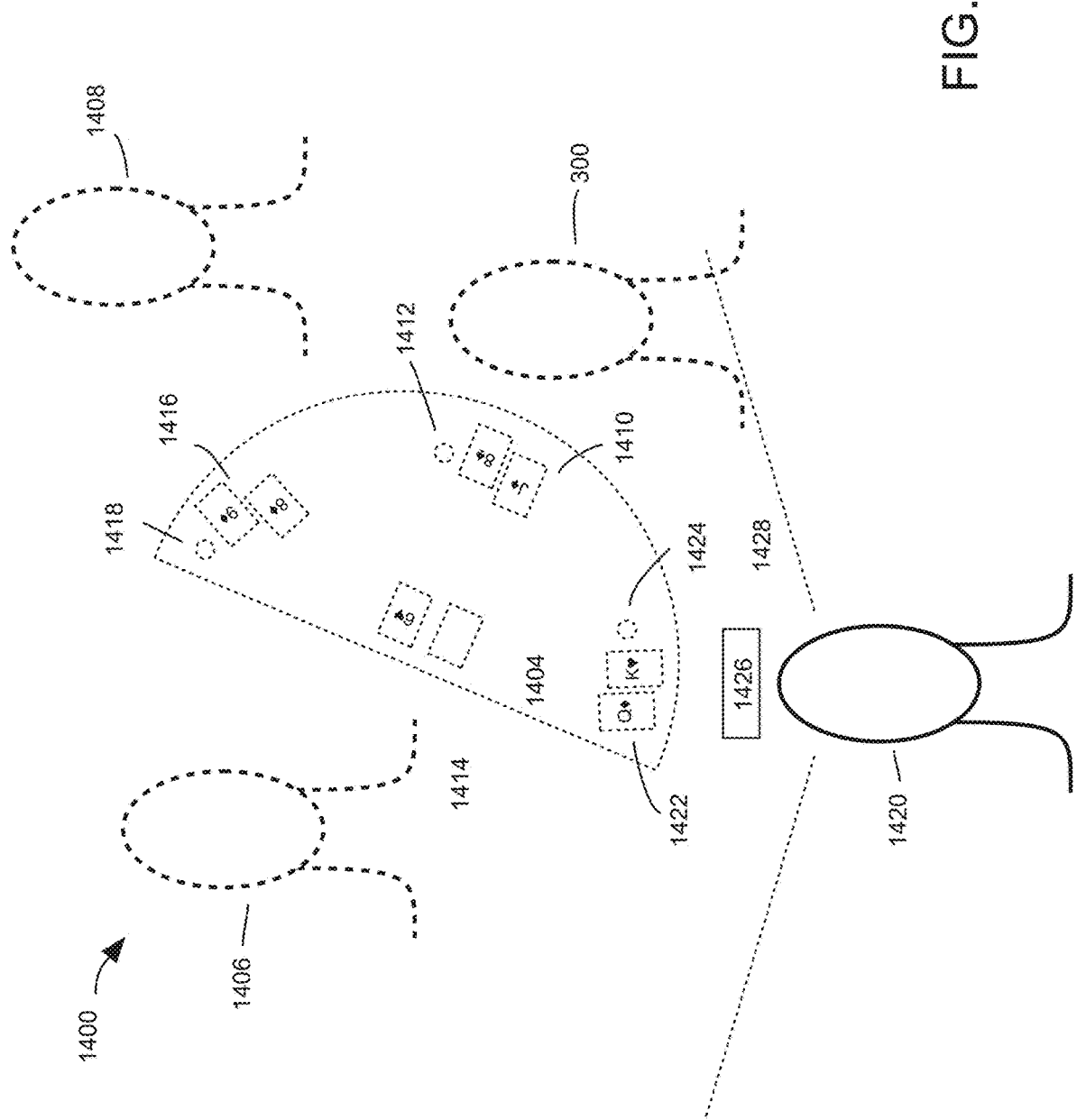
FIG. 14B is a view illustrating the second player of FIG. 14A viewing avatars of the first player and other players, and other elements of the game using an augmented reality viewer as part of a live game according to an embodiment.

In embodiments where the remote player 1420 is a live player, the remote player 1420 can use another AR viewer 1426 to view a scene 1428 of the game corresponding to a field of view of the remote player 1420. In this regard, FIG. 14B illustrates the scene 1428 as viewed by the remote player 1420, with the live elements of the scene 1402 of FIG. 14A being displayed to the remote player 1420 via the AR viewer 1426 as virtual elements. In this example, the first user 300 and the remote player 1420 may be playing at a common location, such as in the same casino, but at different tables.

Figure 15:
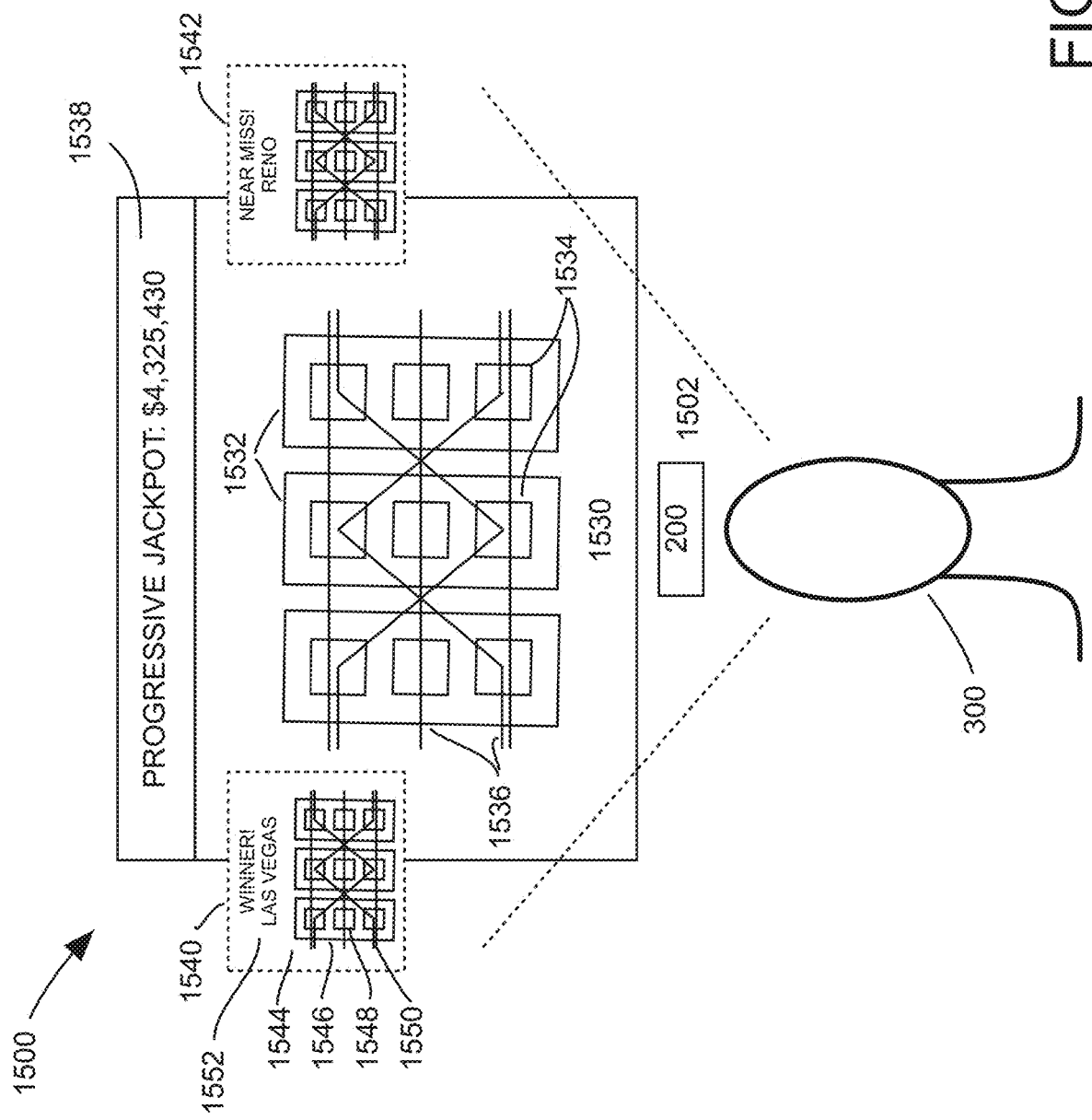
FIG. 15 is a view illustrating a user playing a game having a progressive jackpot and simultaneously viewing other games using an augmented reality viewer associated with the same progressive jackpot, each game associated with a remote player.

In another embodiment, a player of a game can view other games being played simultaneously, such as games associated with a common progressive jackpot. In this regard, FIG. 15 is a view illustrating an AR system 1500 comprising an AR viewer 200 worn by a user 300 so as to provide an AR or mixed reality scene 1502 associated with a field of view of the user 300. In this embodiment, the scene 1502 includes real world elements such as a slot machine display 1530 having a plurality of reels 1532, symbols 1534, and paylines 1536, and a progressive jackpot indicator 1538 associated with a plurality of other slot machines as well. In addition to these real world elements, the AR system 1400 also provides additional AR windows 1540, 1542 each showing an additional slot displays 1544 for another slot machine that is associated with the progressive jackpot. Each additional slot display 1544 includes a plurality of reels 1546, symbols 1548, and paylines 1550, and an indication of the location of the remote slot machine 1552. In this example, the AR window 1540 indicates that another player has won a secondary prize associated with the progressive jackpot, and the other AR window 1542 indicates that another player has had a "near miss," i.e., has nearly won the main prize associated with the progressive jackpot. By providing views of other games being played at the same time for the same progressive jackpot, a player's sense of competition can be enhanced, and the player's interest and excitement can be increased. In some embodiments, the user 300 may make his own slot machine display 1530 available to other viewers, such as friends of the user 300, as a way of sharing the experience.

Additional Mixed Reality Applications

Figure 16A:
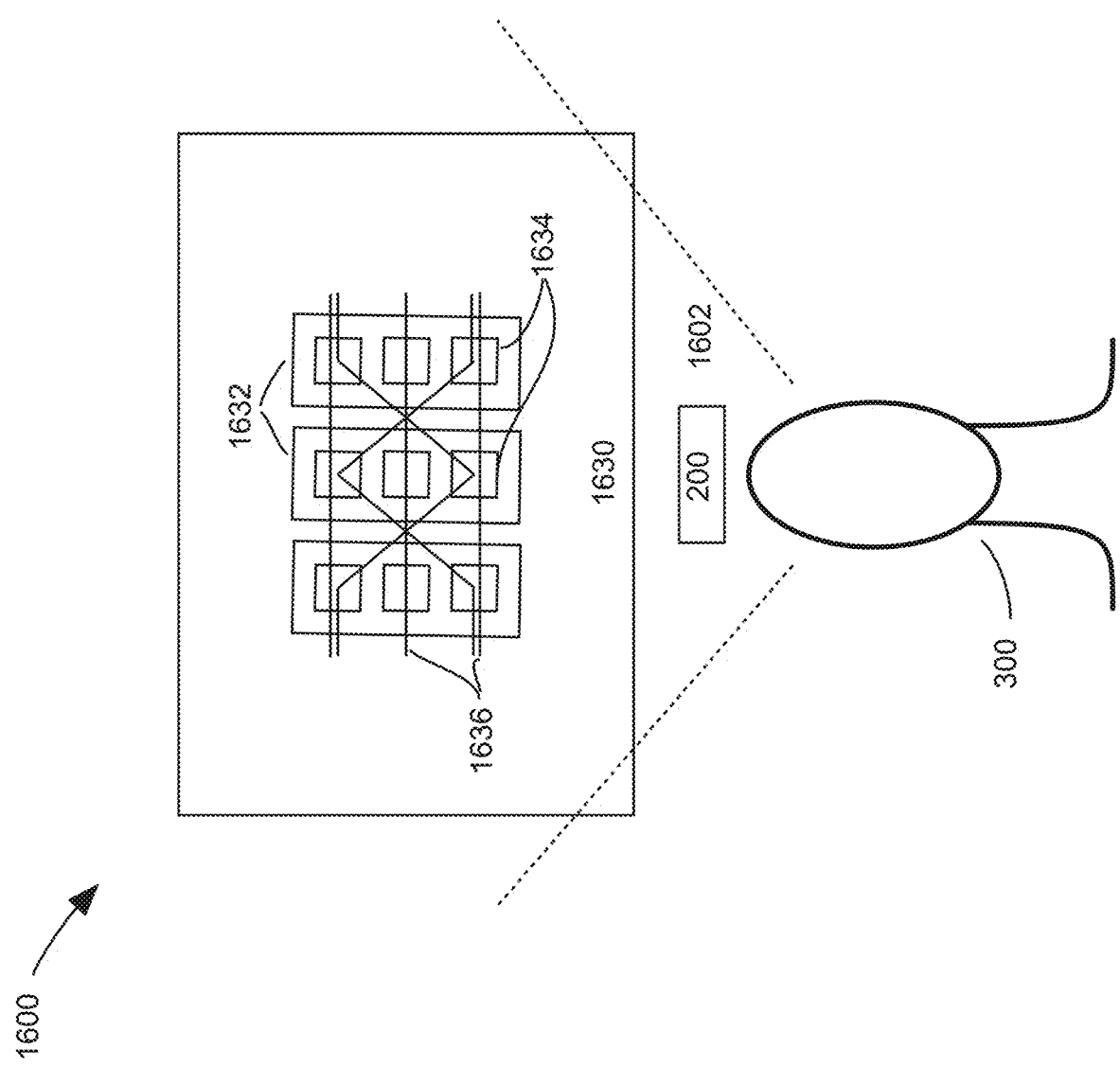
FIG. 16A is a view illustrating a user viewing a wagering game having a plurality of reels associated with a first payout.
Figure 16B:
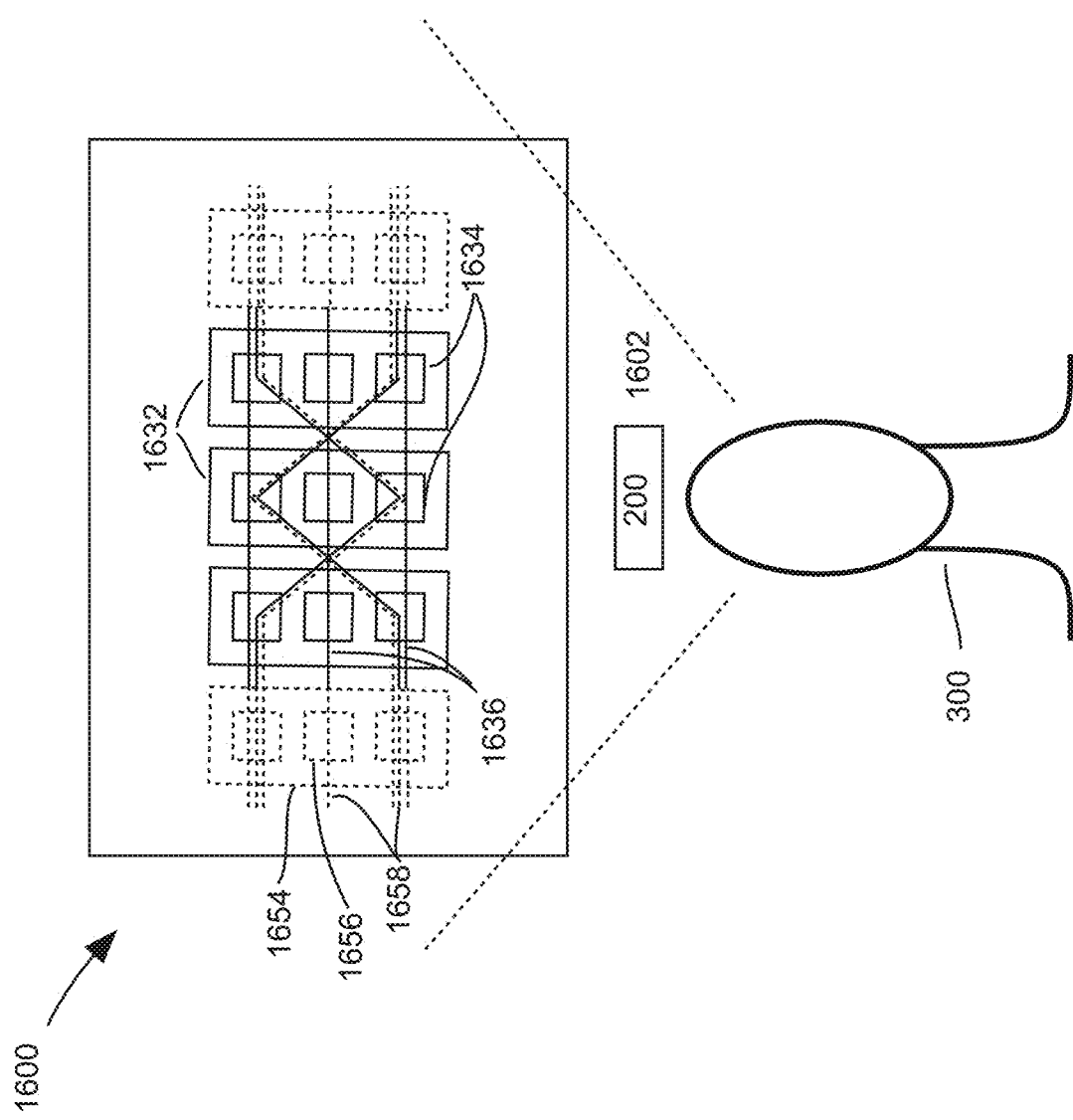
FIG. 16B is a view illustrating the user of FIG. 16A viewing additional reels for the wagering game using an augmented reality viewer as part of a live game according to an embodiment, with all the reels associated with a second payout.

Embodiments may provide additional AR elements that combine with real world elements to provide a new game having new or additional payout options. In this regard, FIGS. 16A and 16B are views illustrating an AR system 1600 comprising an AR viewer 200 worn by a user 300 so as to provide an AR or mixed reality scene 1602 associated with a field of view of the user 300. In this embodiment, the scene 1602 include a slot machine display 1630 having a plurality of first reels 1632, symbols 1634, and paylines 1636. As shown in FIG. 16B, the scene 1602 may also include additional virtual reels 1654 and symbols 1656 that combine with the reels 1632 and symbols 1634 to form new virtual paylines 1658 associated with payouts that are different from the payouts associated with the first paylines 1636. Without the AR viewer 200, the slot machine may be played normally, with only the first paylines 1636 visible and available to the user 300. However, when the user 300 employs the AR viewer, each virtual payline 1658, which may add onto existing first paylines 1636 or which may be unique paylines, is associated with new payouts, which may be more favorable to the user 300.

Figure 17:
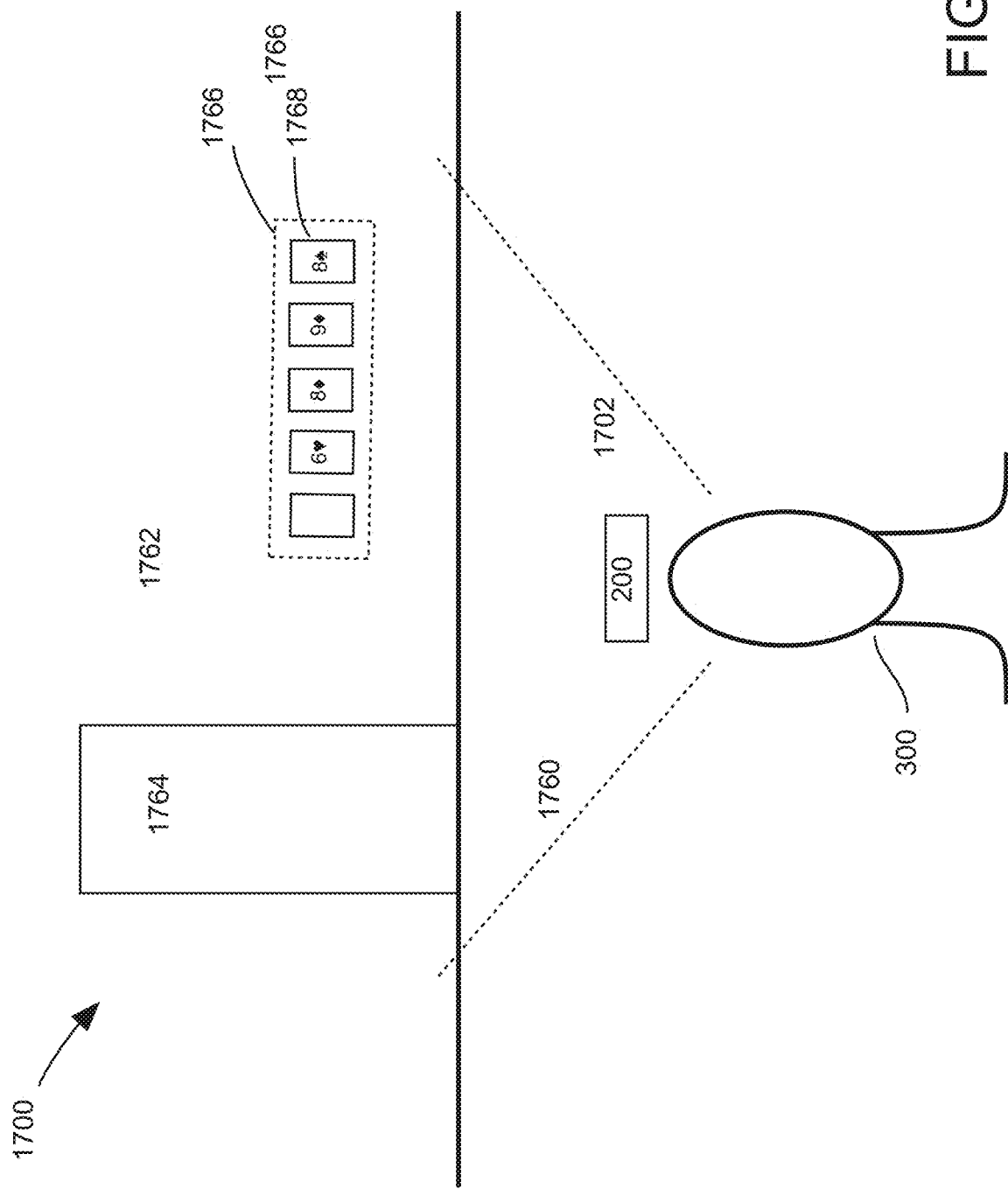
FIG. 17 is a view illustrating a user playing a wagering game after leaving a gaming device associated with the wagering game using an augmented reality viewer as part of a live game according to an embodiment.

In another embodiment, a user may continue to play a wagering game after leaving a gaming device associated with the wagering game using an augmented reality viewer as part of a live game. In this regard, FIG. 17 illustrates an AR system 1700 comprising an AR viewer 200 worn by a user 300 so as to provide an AR or mixed reality scene 1702 associated with a field of view of the user 300. After playing a live game on a physical gaming machine, the user 300 may desire to leave the gaming machine but may also desire to continue playing. After leaving the physical machine, regardless of the contents of the real world scene 1760 for the user 300 (which may contain walls 1762, doors 1764, or other mundane real world elements), an AR gaming display 1766 is provided to the user 300 that continues the game associated with the physical gaming machine with AR gaming elements that correspond to gaming elements of the game on the physical gaming machine, for example.

Figure 18:
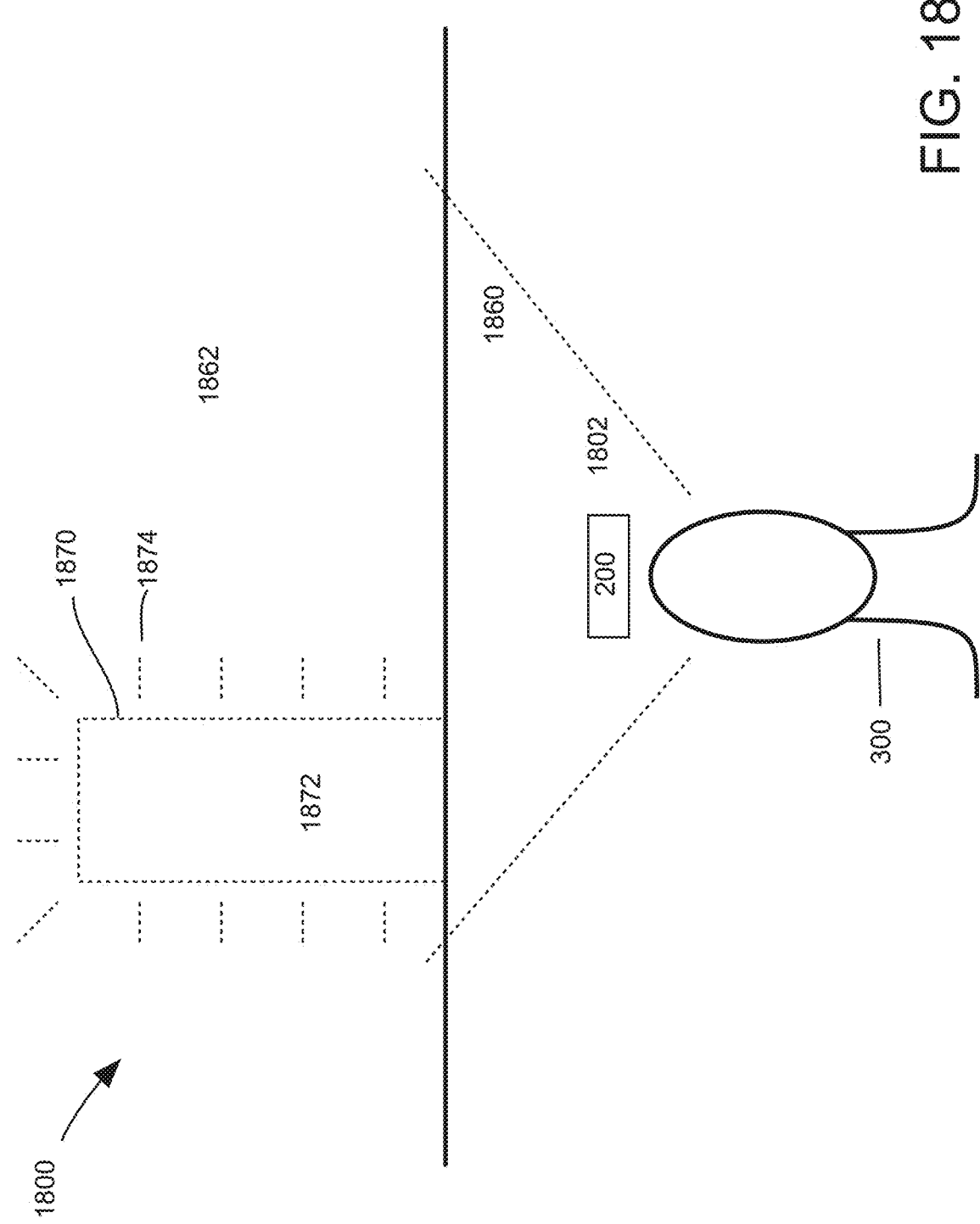
FIG. 18 is a view illustrating a user viewing a virtual door associated with access to an exclusive location using an augmented reality viewer as part of a live game according to an embodiment.

In another embodiment, FIG. 18 is a view illustrating an AR system 1800 comprising an AR viewer 200 worn by a user 300 so as to provide an AR or mixed reality scene 1802 associated with a field of view of the user 300. The scene 1802 includes a real world scene 1860, which may include a wall 1862 of a building interior. On the wall 1862, the AR system 1800 may make an AR virtual door 1870 visible to the user 300. The AR virtual door 1870 may be overlaid over a hidden real world door 1872, so that the real world door 1872 is not easily perceived without the aid of the AR virtual door 1870 presented by the AR system 1800. The AR virtual door 1870 may also be accompanied by visual effects drawing attention of the user 300 to the AR virtual door 1870.

In some embodiments, different AR elements may be placed in the scene 1860 at different real-world locations to encourage the user 300 to visit those locations as part of a virtual treasure hunt. Arriving at the real-world locations by the user 300 may earn special incentives for the user 300, such as a prize, discount, or other reward. In other embodiments, AR elements can be used to guide the user 300 through the casino, providing directions, information, and/or special offers to the user 300.

Figure 19:
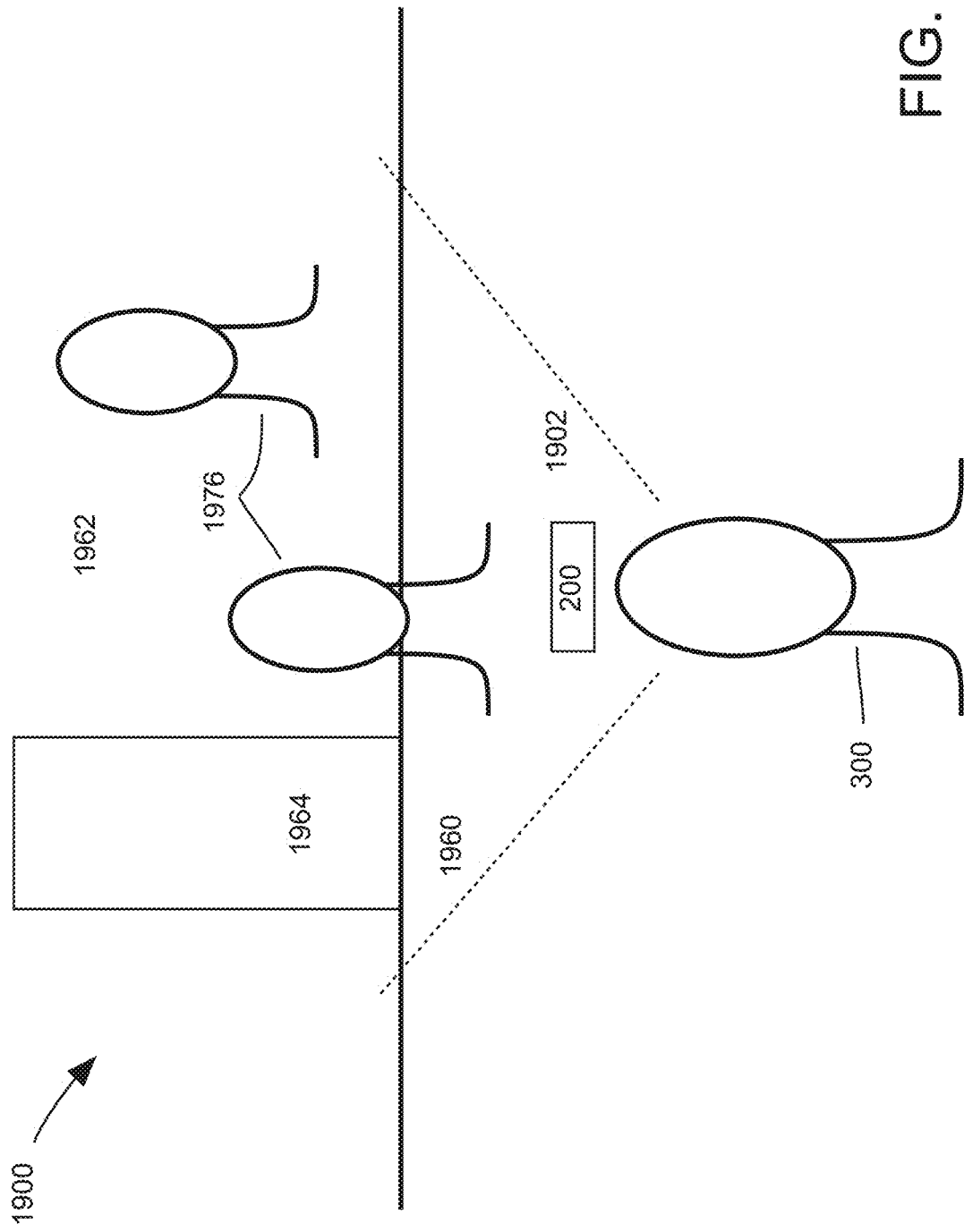
FIG. 19 is a view illustrating a user viewing a plurality of real-world non-gaming elements as part of a wagering game in real time.

In another embodiment, FIG. 19 is a view illustrating an AR system 1900 comprising an AR viewer 200 worn by a user 300 so as to provide an AR or mixed reality scene 1902 associated with a field of view of the user 300. The scene 1902 includes a real world scene 1860, which may include a wall 1862 and door 1964 of a building interior for example. The scene 1902 may also include one or more other people 1976 in the building interior. Using the AR system 1900, a user 300 may view a plurality of real-world non-gaming elements as part of a wagering game in real time.

Additional Methods and Operations

Figure 20:
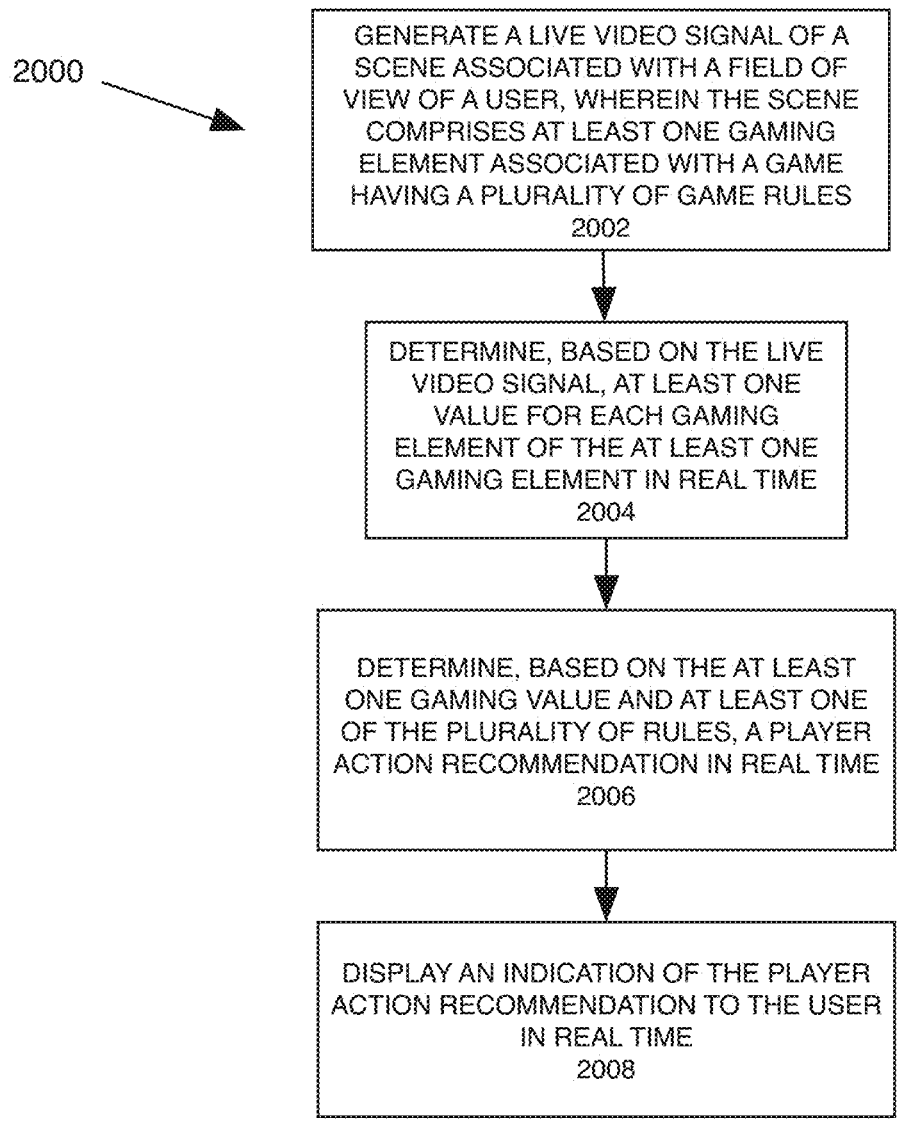

Similar to the embodiment of FIG. 13 above, FIG. 20 illustrates a method 2000 of operating an AR viewer 200 or other device, including generating a live video signal of a scene associated with a field of view of a user, wherein the scene comprises at least one gaming element associated with a game having a plurality of game rules (block 2002). The method 2000 further includes determining, based on the live video signal, at least one value for each gaming element of the at least one gaming element in real time (block 2004). The method 2000 further includes determining, based on the at least one gaming value and at least one of the plurality of rules, a player action recommendation in real time (block 2006). The method 2000 further includes display an indication of the player action recommendation to the user in real time (block 2008).

Figure 21:
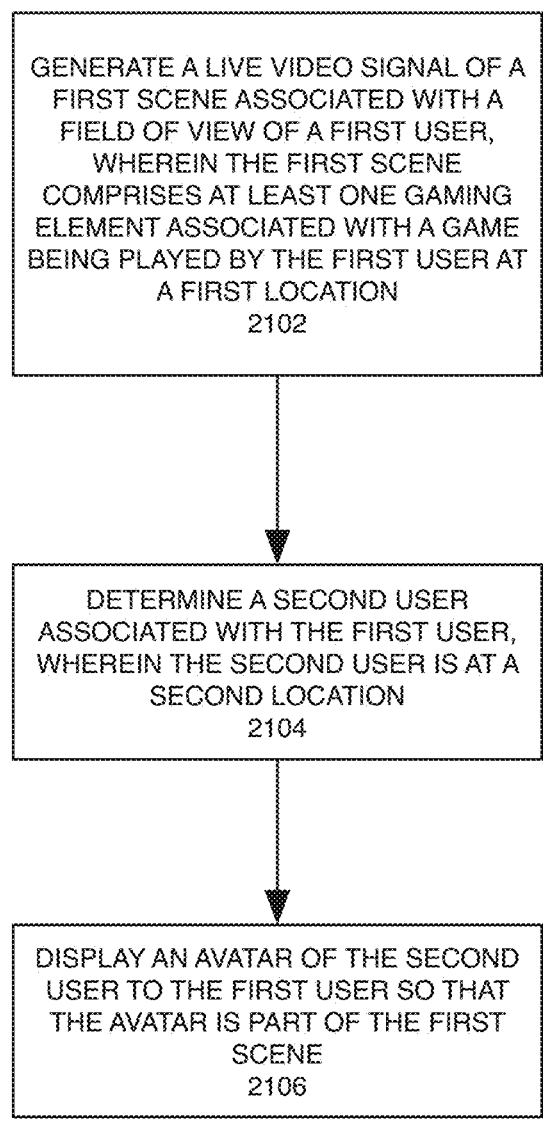

Similar to the embodiment of FIGS. 14A-14B above, FIG. 21 illustrates a method 2100 of operating an AR viewer 200 or other device, including generating a live video signal of a first scene associated with a field of view of a first user, wherein the first scene comprises at least one gaming element associated with a game being played by the first user at a first location (block 2102). The method 2100 further includes determining a second user associated with the first user, wherein the second user is at a second location (block 2104). The method 2100 further includes displaying an avatar of the second user to the first user so that the avatar is part of the first scene (block 2106).

Figure 22:
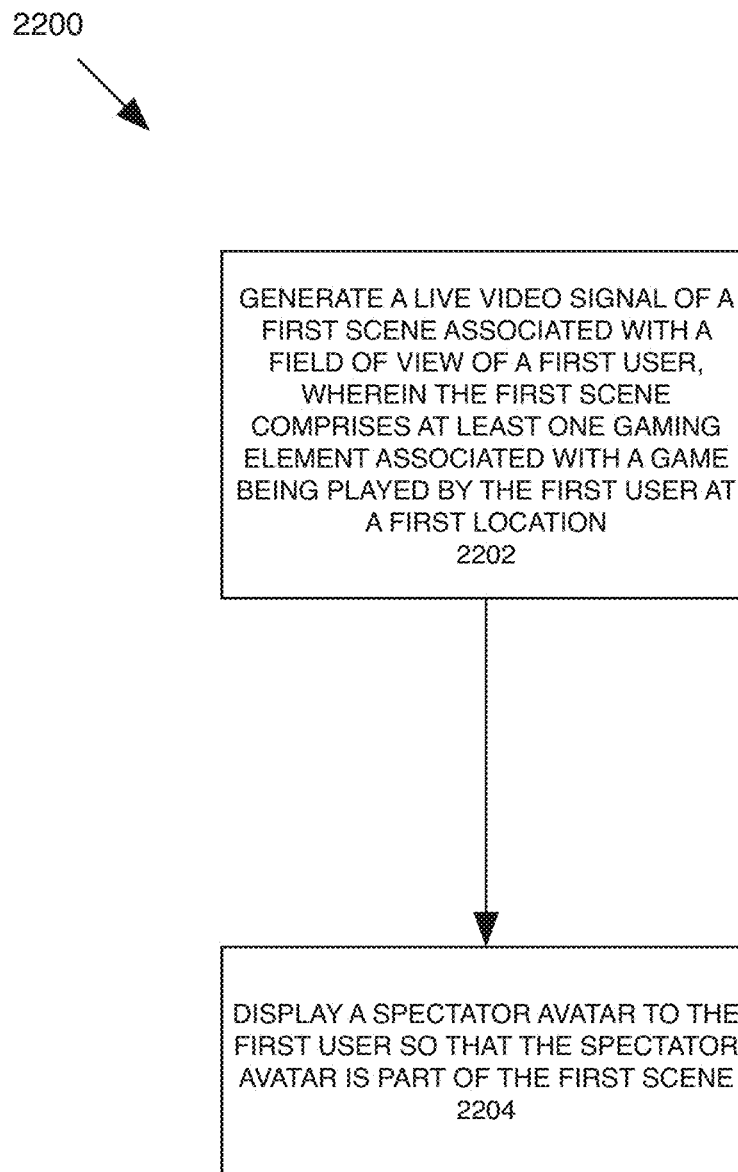

Similar to the embodiment of FIGS. 14A-14B above, FIG. 22 illustrates a method 2200 of operating an AR viewer 200 or other device, including generating a live video signal of a first scene associated with a field of view of a first user, wherein the first scene comprises at least one gaming element associated with a game being played by the first user at a first location (block 2202). The method 2200 further includes displaying a spectator avatar to the first user so that the spectator avatar is part of the first scene (block 2204).

Similar to the embodiment of FIGS. 16A-16B above, FIG. 23 illustrates a method 2300 of operating an AR viewer 200 or other device, including generating a live video signal of a scene associated with a field of view of a user, wherein the scene comprises at least one first gaming element associated with a wagering game, wherein the at least one first gaming element correspond to a first outcome of the wagering game (block 2302). The method 2300 further includes determining, based on the live video signal, at least one second gaming element in real time (block 2304). The method 2300 further includes displaying the at least one second gaming element to the user in association with the at least one first gaming element as part of the scene so that the second gaming element is displayed as part of the wagering game, wherein the at least one first gaming element and the at least one second gaming element correspond to a second outcome of the wagering game (block 2306).

Figure 24:
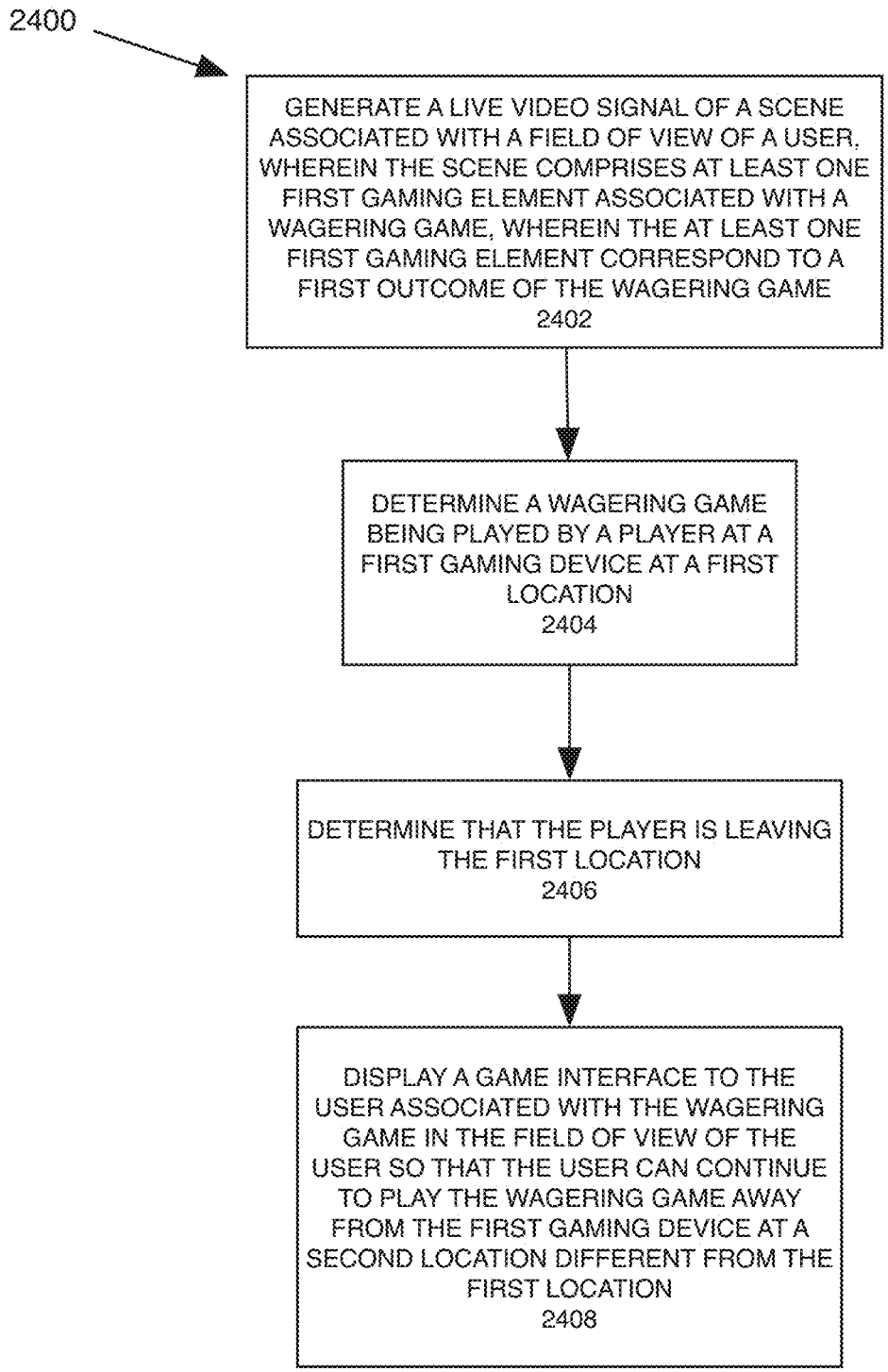

Similar to the embodiment of FIG. 17 above, FIG. 24 illustrates a method 2400 of operating an AR viewer 200 or other device, including generating a live video signal of a scene associated with a field of view of a user, wherein the scene comprises at least one first gaming element associated with a wagering game, wherein the at least one first gaming element correspond to a first outcome of the wagering game (block 2402). The method 2400 further includes determining a wagering game being played by a player at a first gaming device at a first location (block 2404). The method 2400 further includes determining that the player is leaving the first location (block 2406). The method 2400 further includes displaying a game interface to the user associated with the wagering game in the field of view of the user so that the user can continue to play the wagering game away from the first gaming device at a second location different from the first location (block 2408).

Figure 25:
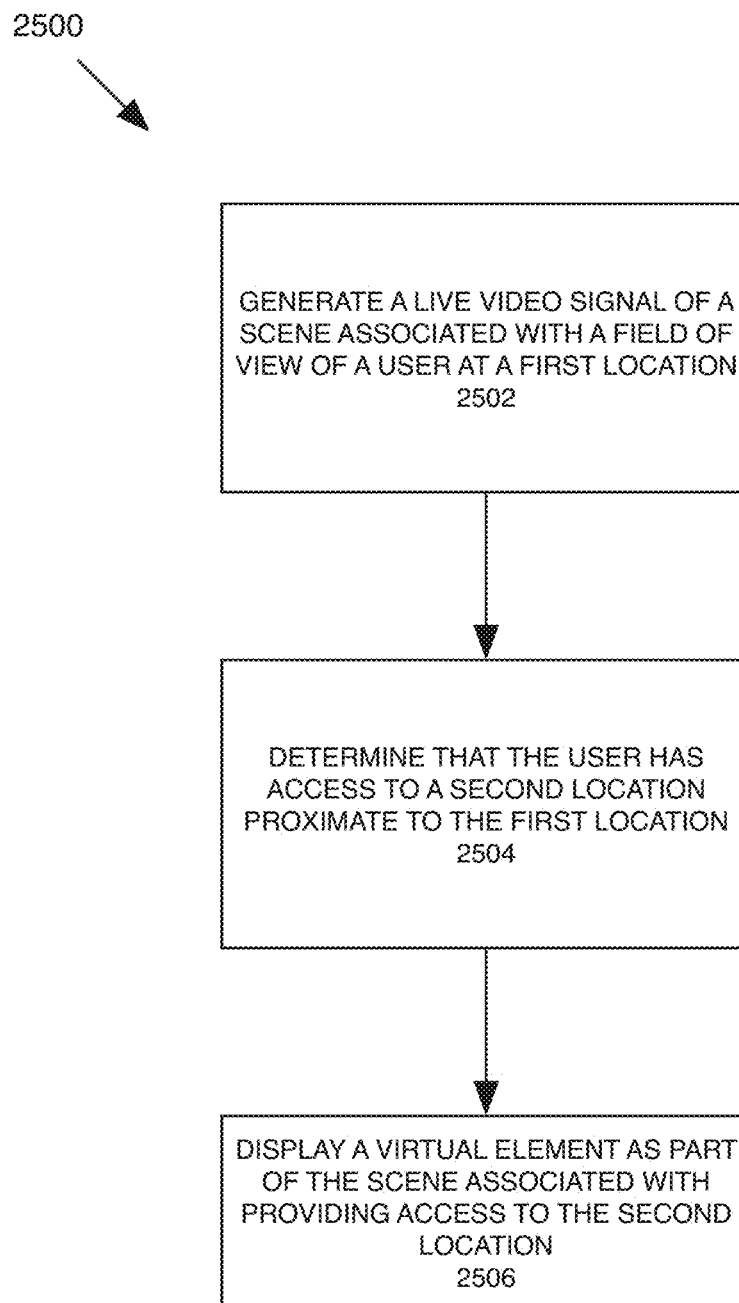

Similar to the embodiment of FIG. 18 above, FIG. 25 illustrates a method 2500 of operating an AR viewer 200 or other device, including generating a live video signal of a scene associated with a field of view of a user at a first location (block 2502). The method 2500 further includes determining that the user has access to a second location proximate to the first location (block 2504). The method 2500 further includes displaying a virtual element as part of the scene associated with providing access to the second location (block 2506).

Figure 26:
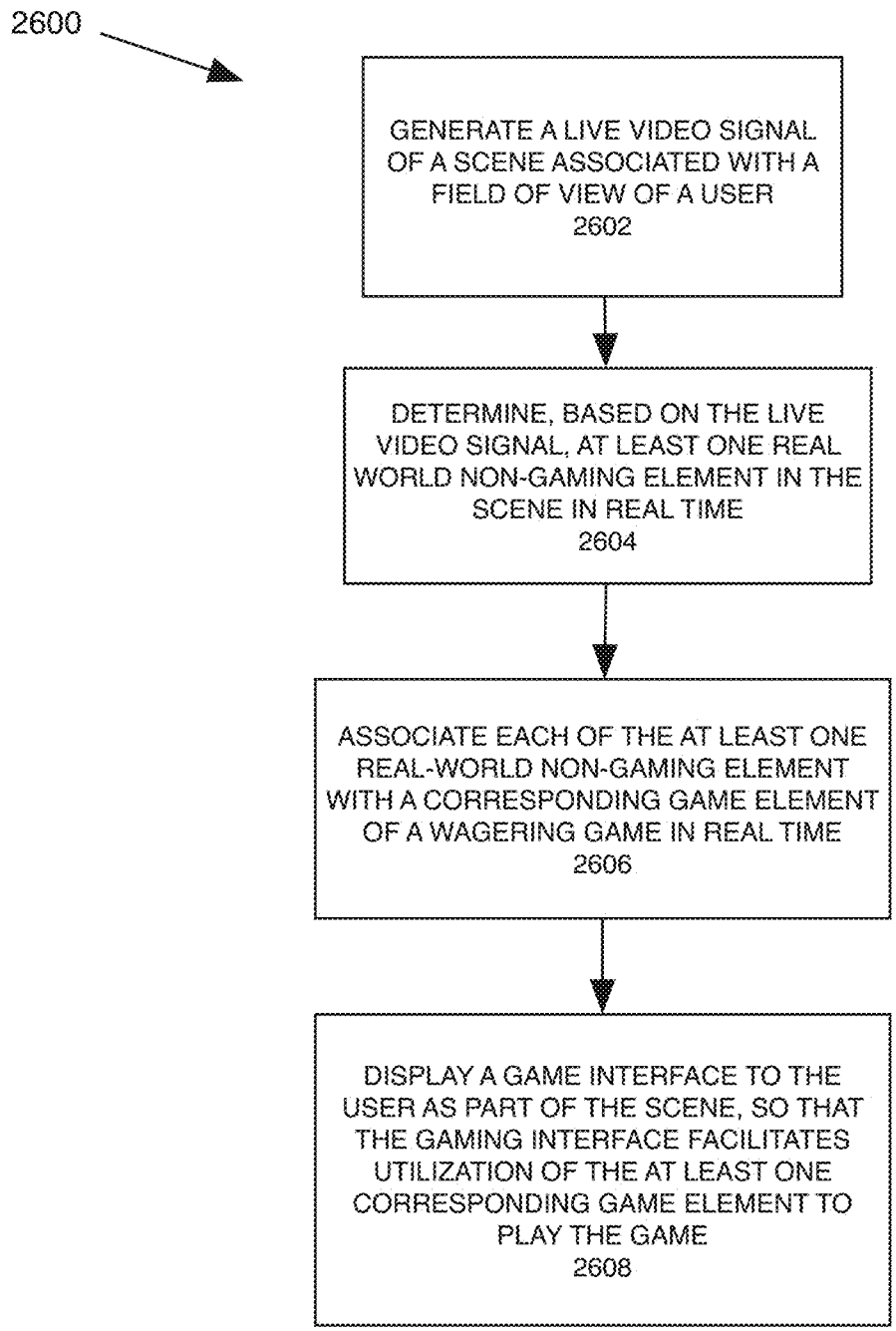

Similar to the embodiment of FIG. 19 above, FIG. 26 illustrates a method 2600 of operating an AR viewer 200 or other device, including generating a live video signal of a scene associated with a field of view of a user (block 2602). The method 2600 further includes determining, based on the live video signal, at least one real world non-gaming element in the scene in real time (block 2604). The method 2600 further includes associating each of the at least one real-world non-gaming element with a corresponding game element of a wagering game in real time (block 2606). The method 2600 further includes displaying a game interface to the user as part of the scene, so that the gaming interface facilitates utilization of the at least one corresponding game element to play the game (block 2608).

Additional Use Cases

Many different gaming applications can be achieved using alternate reality systems/methods according to embodiments described herein, some of which will be described below. However, it will be appreciated that the description of possible applications included herein is not exhaustive, and systems/methods according to embodiments described herein may have many other applications besides those described below.

AR-Themed areas: In an area with games themed according to a particular theme, a large gaming area may be themed in that style using AR systems/methods described herein. For example, in areas where Egyptian themed games are used, a gaming area may be virtually styled using an Egyptian theme, including Egyptian art, music architecture, etc. Players gain a completely new, immersive theme feeling and feel far more comfortable in that augmented area.

Themed wireframe map: On the wireframe map described above in connection with FIG. 3B, the slot machine combinations at different places could also be shown in themed areas. Thus, players may be attracted by the theme on the map they prefer which increases the likelihood to play more games of the favored theme.

The AR scenery presented to the player may include "Easter Eggs" in the form of hidden prizes. for example, continuing with the Egyptian theme, the AR imagery shown to the player may include a small hidden pyramid that can be collected for a small bonus. People walking through the scenery could find them, collect them and thus, start playing a game.

Areas the player has already mastered (e.g. a pre-defined number of games/credits/time played) can be displayed to the player with a crown or a mastery symbol so that the player may be encouraged to try out many different games in order to master new areas.

Scavenger Hunt: When going through the slot machine combinations such as described above in connection with FIG. 4B, the AR systems/methods may display a special symbol or symbol combination hidden in every game on the road map for the player to find. The symbols may include pieces of a puzzle game which gives the player a full image at the end for example.

Additional AR feature games: Players on a certain slot machine can get access to a special bonus when playing a slot game, such as a dice that is rolled in addition to a reel spin, or a wheel that will grant the player entry into a special prize pool, that is shown in AR only. Such games may include system/casino wide games that can be themed accordingly. To implement this, the standard game does not need to be changed. Rather, a player using AR is provided access to special AR bonus games, while a player not using AR simply would not see the bonus games.

Themed Avatar: Every player registered in the AR data base may have his or her own avatar, which may be near or above each player. The player's initial avatar may appear small and unimpressive. However, with increasing levels (indicated by the player's number of games/rounds/credits played) the avatar may become larger, more ornate, obtain accessories, etc., that indicate the player's experience. Seeing other players' avatars may motivate a player to gain a higher leveled avatar as well.

Additionally, a player can challenge another player's avatar if they are at a similar level (e.g. avatar level 20 vs. avatar level 21) and fight for experience points or even credits. This can be compared to a Player vs. Player fight in an online multiplayer battle.

Special Slot AR Bonus: A slot may be marked in AR with a crown or a themed object that turns around above the machine indicating that the player can win special prizes on that machines or collect bonuses if her or she plays all of them during their visit. The marks can be changed by the operator individually (instantly, daily, weekly, happy hour etc.). The bonus may include, for example, an additional AR reel or a special bonus game where AR is needed to succeed.

VIP Bonus: An AR bonus could be enabled once a player played a defined number of rounds or credits. So, the player receives a message "Congratulations! You have now achieved the Special Slot AR Bonus. Earn your bonus right now!" and is highly motivated to keep on playing.

Augmented Achievement System: An AR leader board may be published in the casino and/or on a website associated with a casino or game. The leader board may list the best players of the day/week/month are listed. A player can check the leaderboard and click on another player's profile on the leader board to see their achievements, score, and any other profile information the player wants to share. Additionally, a player can challenge another player in a competition either simultaneously (when they are both in the casino) or one after each other within a given period of time. The players may wager on the competition. Moreover, other players may bet (back bet) on the competition.

AR Viewer Rental: An AR viewer may be rented by a user at a casino, allowing the user to be provided with additional content and/or a fully augmented environment while in the casino, such as specials and promotions for example.

3D Enhancement of 2D Games: A 2D game can be "pulled out" of the screen by the AR viewer by replicating the 2D game in 3D for the AR viewer. The 3D AR elements can include additional elements and/or animations, thereby enhancing the traditional 2D game.

Better Odds using AR: Users may be incentivized to use the AR viewer by receiving better odds on games when using AR features.

Payment and Prizing through AR Viewer: The AR viewer may function as a payment and prizing mechanism for a game, with the glasses linked to or functioning as a credit card for example.

Real-Time 3D Sports Betting: The AR viewer can allow a user to view a sporting event, such as a game or race and view additional content, such as an overview of the game field or racetrack with AR elements, additional camera angles, or 3D representations of other aspects of the event.

Casino AR Membership: By joining a casino players' club or upgrading to a premium tier membership, a user may receive an AR viewer automatically, with accompanying benefits, such as increased odds, special offers, etc. This may provide additional incentive for a user to become a member or upgrade his membership to a premium tier. Frequent, registered gamblers may also receive an AR viewer automatically, thereby providing an incentive to visit the casino and gamble more often.

Anonymous Play: A player may user an AR viewer to bet anonymously, e.g., bet an anonymous amount of chips or bet an anonymous number or color. By betting anonymously, other players are not able to see the player's actions, which may allow a self-conscious or shy player to feel more comfortable betting in the casino environment.

AR Social Network: Users of the AR viewer may be able to access an exclusive community of other AR viewer users, allowing users to connect, share their experiences, become friends, meet in real life, etc.

Augmented Table Games: In some embodiments, the user can perform virtual actions associated with real world actions, such as throwing a virtual roulette ball, or throwing virtual craps dice in place of a real world roulette ball or craps dice. In some examples, the AR elements may be provided in addition to real world elements to increase the odds for the player.

Player Tracking

In various embodiments, the gaming system includes one or more player tracking systems under control of the player tracking module 20B shown in FIG. 11C. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

As noted above, a player's progress or status can be saved in other ways besides using a player tracking system, such as by generating, when the player cashes out, a ticket including a printed code, such as a bar code or QR code, that identifies the player's session. When the player wants to continue the game, the player may insert the ticket including the printed code into the bill/ticket acceptor 128 of an EGM 100 (which may or may not be the same EGM 100 from which the ticket was issued). The EGM 100 reads the printed code and retrieves the player's status in response to the printed code.

Other EGM Features

Embodiments described herein may be implemented in various configurations for EGMs 100*s*, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processor and memory devices. In such a "thick client" embodiment, the EGM local processor executes the communicated computerized instructions to control any games (or other suitable interfaces) provided to a player.

In some embodiments, an EGM may be operated by a mobile device, such as a mobile telephone, tablet other mobile computing device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. A method comprising:
   generating a live video signal of a first scene associated with a field of view of a first user, wherein the first scene comprises a plurality of real-world elements comprising a display of a plurality of slot machine reels that comprise a first game being played by the first user at a first real-world location, wherein the display of the plurality of slot machine reels defines a first payline that determines a first game outcome that comprises a payout of the first game;

determining, based on the live video signal, at least one second gaming element comprising a virtual reel; and displaying an augmented reality ("AR") representation of the virtual reel in association with the plurality of slot machine reels as part of the first scene to the first user, wherein a combination of the plurality of slot machine reels and the virtual reel comprise a second game being played by the first user at the first real-world location, wherein the combination of the plurality of slot machine reels and the virtual reel defines a second payline that determines a second game outcome that comprises a payout of the second game.

2. The method of claim 1, wherein the first real-world location is associated with a first table in a common gaming location.

3. The method of claim 2, wherein the common gaming location is a casino.

4. The method of claim 1, further comprising displaying a spectator avatar to the first user so that the spectator avatar is a non-real-world element of the first scene.

5. The method of claim 4, wherein the spectator avatar is an AR representation of a first spectator at a real-world location that is different from the first real-world location.

6. The method of claim 4, wherein the spectator avatar is a virtual spectator that is not associated with a real-world spectator.

7. The method of claim 1, further comprising:
determining a second user that is separate from the plurality of real-world elements, wherein the second user is at a second real-world location; and
displaying a second scene of the first game to the second user associated with a field of view of the second user so that the second scene comprises an AR representation of the first user and an AR representation of at least one of the plurality of real-world elements.

8. The method of claim 1, wherein the second outcome comprises a final outcome of the first game.

9. A method comprising:
generating a live video signal of a first scene associated with a field of view of a first user, wherein the first scene comprises at least one gaming element associated with a physical gaming machine being played by the first user at a first location, wherein the at least one gaming element determines a first game outcome that comprises a payout of the physical gaming machine;
determining the first user is leaving the first location; and
displaying an augmented reality ("AR") representation of a game interface to the first user that comprises a game comprising the at least one gaming element that is associated with the physical gaming machine and that provides the first user the game interface to continue playing a continuation of the game that was started on the physical gaming machine in a second field of view of the first user in a second location, wherein the second location is remote from the first location, and
wherein the first field of view is different from the second field of view.

10. An augmented reality system comprising:
a memory; and
a processing device coupled to the memory, the processing device configured to:
generate a live video signal of a first scene associated with a field of view of a first user, wherein the first scene comprises a plurality of real-world elements comprising a display of a plurality of slot machine reels that comprise a first game being played by the first user at a first real-world location, wherein the display of the plurality of slot machine reels defines a first payline that determines a first game outcome that comprises a payout of the first game;
determine, based on the live video signal, at least one second gaming element comprising a virtual reel; and
display an augmented reality ("AR") representation of the virtual reel in association with the plurality of slot machine reels as part of the first scene to the first user,
wherein a combination of the plurality of slot machine reels and the virtual reel comprise a second game being played by the first user at the first real-world location, wherein the combination of the plurality of slot machine reels and the virtual reel defines a second payline that determines a second game outcome that comprises a payout of the second game.

11. The augmented reality system of claim 10, wherein the first real-world location is associated with a first table in a common gaming location.

12. The augmented reality system of claim 11, wherein the common gaming location is a casino.

13. The augmented reality system of claim 10, further comprising displaying a spectator avatar to the first user so that the spectator avatar is a non-real-world element of the first scene.

14. The augmented reality system of claim 13, wherein the spectator avatar is a virtual spectator that is not associated with a real-world spectator.

15. The augmented reality system of claim 10, further comprising:
determining a second user that is separate from the plurality of real-world elements, wherein the second user is at a second real-world location; and
displaying a second scene of the first game to the second user associated with a field of view of the second user so that the second scene comprises an AR representation of the first user and an AR representation of at least one of the real-world elements.

16. The augmented reality system of claim 10, wherein at least one real-world element of the plurality of real-world elements corresponds to a first game final outcome.

17. The augmented reality system of claim 10, wherein, based on the live video signal, the at least one second gaming element is determined in real time.

18. An augmented reality system comprising:
a memory; and
a processing device coupled to the memory, the processing device configured to:
generate a live video signal of a first scene associated with a field of view of a user, wherein the first scene comprises a gaming element associated with a physical game being played by the user at a first real-world location, wherein the gaming element determines a first game outcome that comprises a payout of the physical gaming machine; and
determine the user is leaving the first location; and
display an augmented reality ("AR") representation of a game interface to the user that comprises the gaming element that is associated with the physical gaming machine and that was previously started on the physical gaming machine in a second field of
view of the user in a second location,
wherein the second location is different from the first
location, and
wherein the first field of view is different from the second
field of view.

* * * * *